US009985296B2

(12) United States Patent
Asefa et al.

(10) Patent No.: US 9,985,296 B2
(45) Date of Patent: May 29, 2018

(54) POLYMER-DERIVED CATALYSTS AND METHODS OF USE THEREOF

(71) Applicant: RUTGERS, THE STATE UNIVERSITY OF NEW JERSEY, New Brunswick, NJ (US)

(72) Inventors: Tewodros Asefa, Princeton, NJ (US); Rafael Silva, Piscataway, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 873 days.

(21) Appl. No.: 14/200,833

(22) Filed: Mar. 7, 2014

(65) Prior Publication Data

US 2014/0255822 A1    Sep. 11, 2014

Related U.S. Application Data

(60) Provisional application No. 61/774,086, filed on Mar. 7, 2013.

(51) Int. Cl.
| | | |
|---|---|---|
| *C01B 32/05* | (2017.01) | |
| *C01B 33/00* | (2006.01) | |
| *C01B 21/00* | (2006.01) | |
| *H01M 4/96* | (2006.01) | |
| *C01B 31/02* | (2006.01) | |
| *H01M 4/90* | (2006.01) | |
| *C01B 31/00* | (2006.01) | |
| *C01B 37/02* | (2006.01) | |

(52) U.S. Cl.
CPC ............... *H01M 4/96* (2013.01); *C01B 31/00* (2013.01); *C01B 31/02* (2013.01); *C01B 37/02* (2013.01); *H01M 4/90* (2013.01)

(58) Field of Classification Search
CPC .......... B01J 20/26; B01J 20/268; B01J 20/20; C01B 32/00; C01B 32/05; C01B 33/00; C01B 21/00; H01M 4/96
See application file for complete search history.

(56) References Cited

U.S. PATENT DOCUMENTS

| 2009/0304570 A1* | 12/2009 | Kim ...................... B01J 21/18 |
| | | 423/445 R |
| 2010/0078706 A1* | 4/2010 | Matsuda ......... H01L 21/28282 |
| | | 257/326 |
| 2011/0082024 A1* | 4/2011 | Liu ...................... A61K 9/51 |
| | | 502/5 |
| 2012/0088187 A1 | 4/2012 | Wu et al. |

FOREIGN PATENT DOCUMENTS

| CN | 101941688 | * | 1/2011 | ............ C01B 31/02 |
| KR | 20020084372 | * | 11/2002 | ............ B01J 20/20 |

OTHER PUBLICATIONS

Fuertes, Antonio B., Template Systhesis of Mesoporous Carbons With a Controlled Particle Size, 2003, Journal of Material Chemistry, vol. 13, pp. 3085-3088.*

(Continued)

*Primary Examiner* — Ling Siu Choi
*Assistant Examiner* — Thuy-Ai N Nguyen
(74) *Attorney, Agent, or Firm* — Robert C. Netter, Jr.; Dann, Dorfman, Herrell & Skillman

(57) ABSTRACT

Electrocatalytic polyaniline-derived mesoporous carbon nanoparticles and methods of synthesizing and using the same are provided.

15 Claims, 21 Drawing Sheets

(56) References Cited

OTHER PUBLICATIONS

Figure 1:
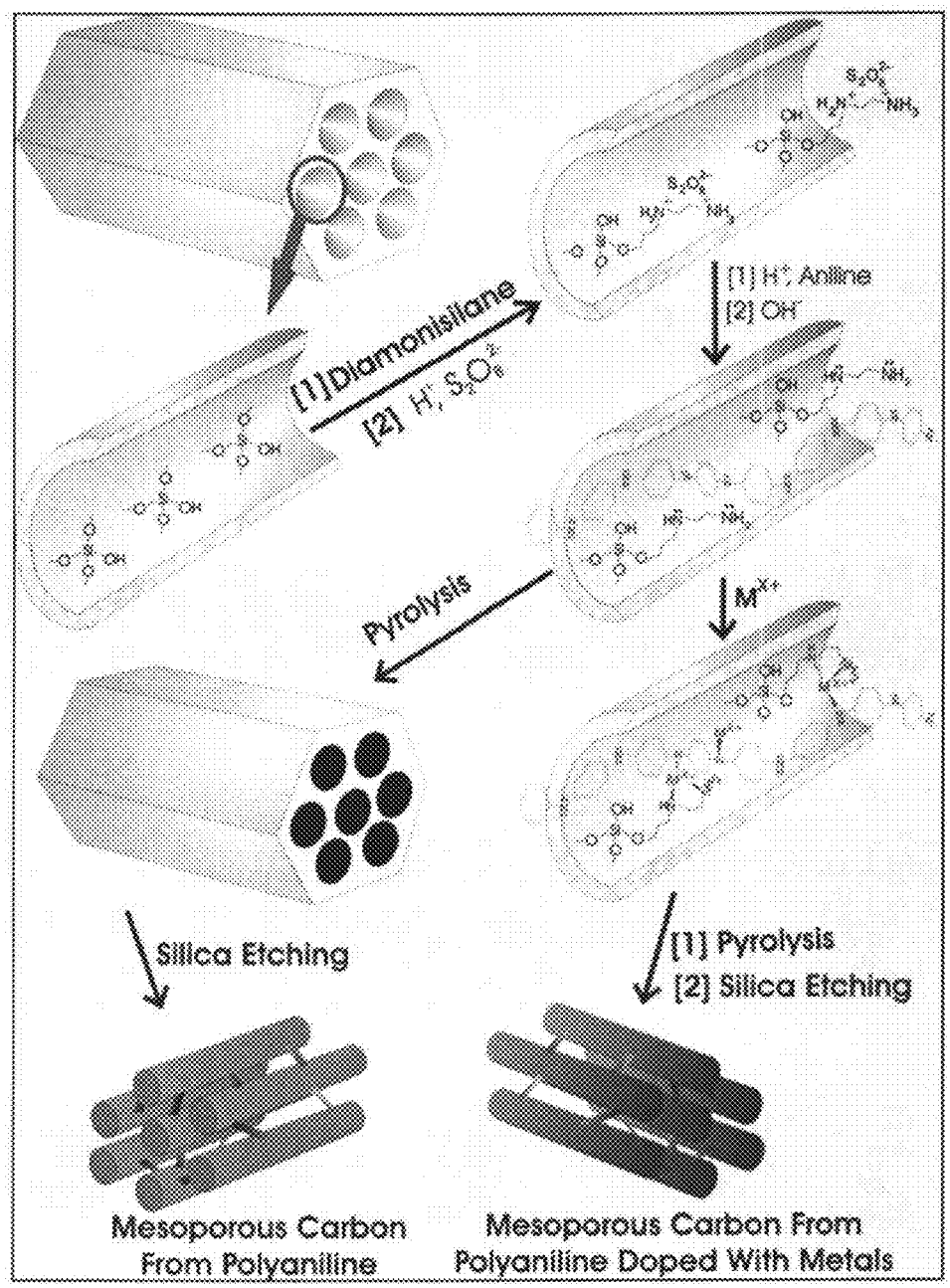

Gavrilov, N., et al., "Electrocatalysis of Oxygen Reduction Reaction on Polyaniline-derived Nitrogen-doped Carbon Nanoparticle Surfaces in Alkaline Media," J. Power Sources (2012) 220:306-316.
Silva, R., et. al., "Noble Metal-Free Oxidative Electrocatalysts: Polyaniline and Co(II)-Polyaniline Nanostructures Hosted in Nanoporous Silica," Adv. Mater. (2012) 24:1878-1883.
Wu, G., et al., "High-Performance Electrocatalysts for Oxygen Reduction Derived from Polyaniline, Iron, and Cobalt," Science (2011) 332:443-447.

* cited by examiner

POLYMER-DERIVED CATALYSTS AND METHODS OF USE THEREOF

This application claims priority under 35 U.S.C. § 119(e) to U.S. Provisional Patent Application No. 61/774,086, filed Mar. 7, 2013. The foregoing application is incorporated by reference herein.

This invention was made with government support under Grant Nos: CHE-1004218, DMR-0968937, and NanoEHS-1134289 awarded by the National Science Foundation (NSF). The government has certain rights in the invention.

FIELD OF THE INVENTION

The present invention relates to the field of catalysts. Specifically, efficient nanocatalysts, methods of synthesis, and methods of use thereof are disclosed.

BACKGROUND OF THE INVENTION

Several publications and patent documents are cited throughout the specification in order to describe the state of the art to which this invention pertains. Each of these citations is incorporated herein by reference as though set forth in full.

In the face of global problems associated with the lack of sustainable and renewable energy sources and environmental pollutions caused by fossil fuels, fuel cells have long been expected to contribute to the solutions to these daunting problems by helping the production of electricity from fuels such as hydrogen. Unfortunately, however, the electrodes (both cathode and anode) in many conventional fuel cells are composed of the expensive and less earth abundant noble metal platinum, which serves as the electrocatalyst. This remains one of the bottlenecks currently plaguing fuel cells from finding a wide range of applications. The second major problem in fuel cells remains the inherent poor efficiency of the oxygen reduction reaction (ORR)— one of the redox reactions that has to take place at one of the half cells within fuel cells. Even with the use of platinum-based electrodes or electrocatalysts, this reaction is very sluggish or has high overpotential. For instance, while hydrogen oxidation reaction (HOR) on the anode side of the fuel cells typically occurs with overpotential as low as 50 mV, the ORR often has an overpotential as high as 500-600 mV, even with platinum-based electrocatalysts (Norskov et al. (2004) J. Phys. Chem. B, 108:17886). The ORR is, therefore, mainly responsible for the limited current density and reduced cell voltages obtained from fuel cells. Thus, a massive improvement in fuel cells requires not only finding electrocatalysts based on sustainable and earth-abundant elements but also rationally designing and synthesizing noble metal-free and inexpensive electrocatalysts capable of performing ORR as efficiently as, if not better than, platinum.

Recent efforts to obtain replacements of platinum and its congener metals for ORR have resulted in some new options, including some N-doped carbon-based materials, which showed promising catalytic activity for ORR (Gupta et al. (1889) J. Appl. Electrochem., 19:19; Gojkovic et al. (1999) J. Electroanal. Chem., 462:63; Matter et al. (2006) J. Catal., 239:83). These and other studies have also suggested that further improvements on the catalytic activities of carbon-based materials are possible by doping the latter with heteroatoms such as boron, phosphorus or sulfur. However, the mechanisms by which these heteroatom-doped carbon-based electrocatalysts improve ORR as well as the functions of the heteroatoms in these systems are not yet well-understood (Wang et al. (2012) Angew. Chem. Int. Ed., 51:4209). Nevertheless, many recent studies on nonmetallic heteroatom-doped carbon materials indicate that superior activity toward ORR may require multifunctional catalytic systems (Wang et al. (2011) Angew. Chem. Int. Ed., 50:11756).

Besides nonmetals, metallic dopants, mainly cobalt ions, have also been demonstrated to improve the electrocatalytic activity of N-doped carbon-based materials. Although some authors suggested that metal ions that remain coordinated to the nitrogen atoms of the N-doped carbons act as the active sites, there are other recent studies suggesting otherwise (Lefevre et al. (2000) J. Phys. Chem. B, 104:11238; Sawai et al. (2004) J. Electrochem. Soc., 151:A682; Lefevre et al. (2009) Science, 324:71; Subramanian et al. (2009) J. Power Sources, 188:38; Kothandaraman et al. (2009) Appl. Catal. B: Environ., 92:209; Kundu et al. (2009) J. Phys. Chem. C, 113:14302). For instance, it has been suggested that the added metals affect only the carbonization process of the molecular precursors into better N-doped carbon electrocatalysts by promoting the formation active nitrogen catalytic centers within the material (Oh et al. (2012) J. Power Sources, 212:220). Cobalt was also shown to enhance ORR when it was added in the form of nanostructures, such as Co, CoO and $Co_3O_4$ nanoparticles, onto graphene oxide, carbon nanotubes or conducting polymers. This provides further evidence for why having cobalt or metal dopants into carbon-based materials is considered to improve the electrocatalytic activity of the latter toward ORR (Bashyam et al. (2006) Nature, 443:63). Nevertheless, regardless of how metal dopants enable improvements in electrocatalytic activity of carbon-based materials, metal-free catalysts are still preferable for ORR, especially if the latter show good enough electrocatalytic activity. This is mainly because ORR is often carried out under acidic or basic media, and metals such as cobalt can easily leach out from the electrodes' (electrocatalysts') surfaces over time under these conditions, if not quickly, and result in reduced electrocatalytic activity and shorter shelf-lives to the electrocatalyst (Wang, B. (2005) J. Power Sources, 152:1).

SUMMARY OF THE INVENTION

In accordance with the present invention, polymer-derived mesoporous carbon, particularly polyaniline-derived mesoporous carbon (PDMC), (e.g., as nanoparticles) and methods of synthesizing the same are provided. In a particular embodiment, the method comprises heating polymer (e.g., polyaniline) contained within a mesoporous template until carbonization (e.g., to a temperature greater than about 600° C.); and isolating and/or recovering the polymer (e.g., polyaniline)-derived mesoporous carbon from the template. In a particular embodiment, the polymer-derived mesoporous carbon comprises less than about 1.0% metal by weight or is void of metal. In a particular embodiment, the mesoporous template is a mesoporous silica such as SBA-15. In a particular embodiment, the polymer is synthesized within the mesoporous template.

In accordance with the instant invention, methods of catalyzing a chemical reaction are provided. The methods comprise adding at least one polymer-derived mesoporous carbon of the instant invention to the chemical reaction as a catalyst. In a particular embodiment, the polymer-derived mesoporous carbon is a polyaniline-derived mesoporous carbon. In a particular embodiment, the chemical reaction is the oxygen reduction reaction (ORR) or the hydrazine oxidation reaction.

In accordance with another aspect of the instant invention, membrane electrode assemblies comprising at least one metal free polymer (e.g., polyaniline)-derived mesoporous carbon of the instant invention are provided. The instant invention also encompasses fuel cells comprising the membrane electrode assembly.

BRIEF DESCRIPTIONS OF THE DRAWING

FIG. 1 provides a schematic for the synthesis of N- and O-doped mesoporous carbons with or without metal dopants by carbonization of in situ polymerized polyaniline within SBA-15 mesoporous silica (PANI/SBA-15 composite material).

FIGS. 2A-2F provide TEM images of mesoporous carbons obtained by carbonization of PANI/SBA-15 at 600° C. (FIGS. 2A, 2B) and 800° C. (FIGS. 2C, 2D), and PANI/SBA-15 containing $Co^{2+}$ ions at 800° C. (FIGS. 2E, 2F).

FIG. 3A provides cyclic voltammograms in $O_2$ and $N_2$ saturated 0.1 mol/L KOH solutions of polyaniline-derived mesoporous carbon (PDMC) synthesized at a pyrolysis temperature of 800° C. FIG. 3B provides polarization curves at different rotating speeds of PDMC synthesized at a pyrolysis temperature of 800° C., with the corresponding Koutecky-Levich plot shown in inset. FIG. 3C provides polarization curves at 900 rpm of PDMCs synthesized at different temperatures. FIG. 3D shows $J_k$ (kinetic current density) at different potentials for PDMCs prepared with different metals and at different temperatures. FIG. 3E provides polarization curves at 900 rpm of PDMCs containing different metals. FIG. 3F shows the number of electrons transferred as a function of the potential for PDMCs prepared at different temperatures.

FIG. 4A provides a schematic of the nitrogen species within the N-doped PDMCs. FIG. 4B provides a graph of the N/C ratio versus temperature of pyrolysis. FIGS. 4C and 4D provide the atomic content of the indicated species as a function of pyrolysis temperature.

Figure 5A:
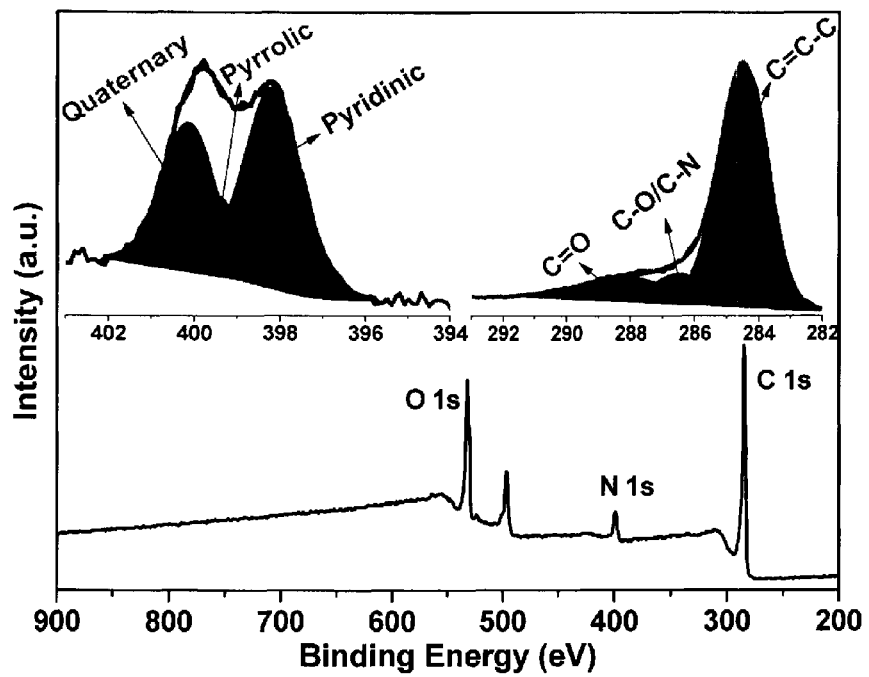
Figure 5B:
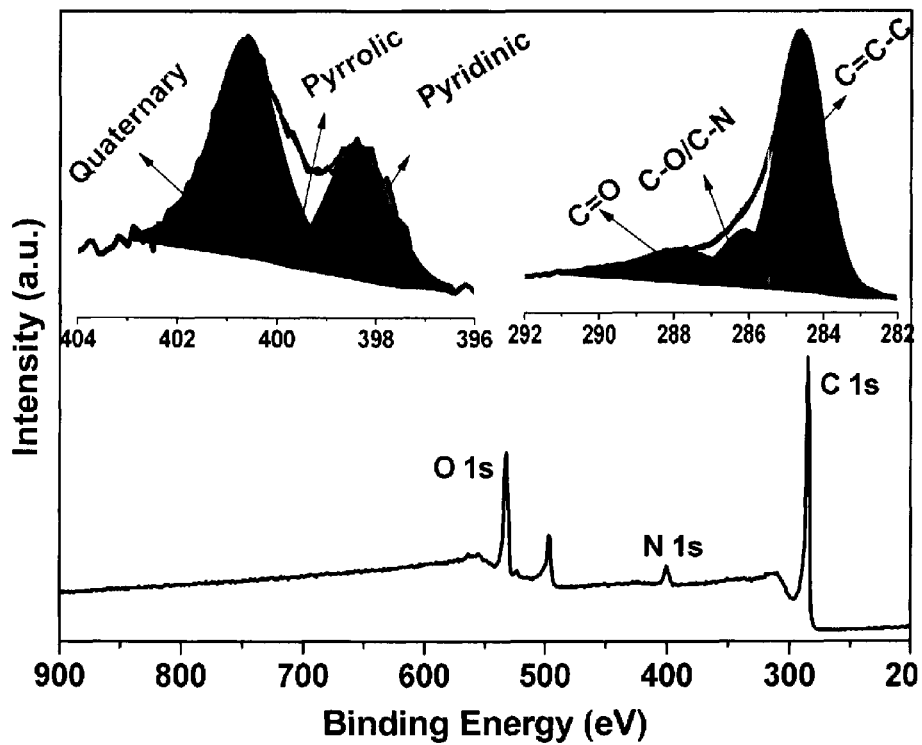
Figure 5C:
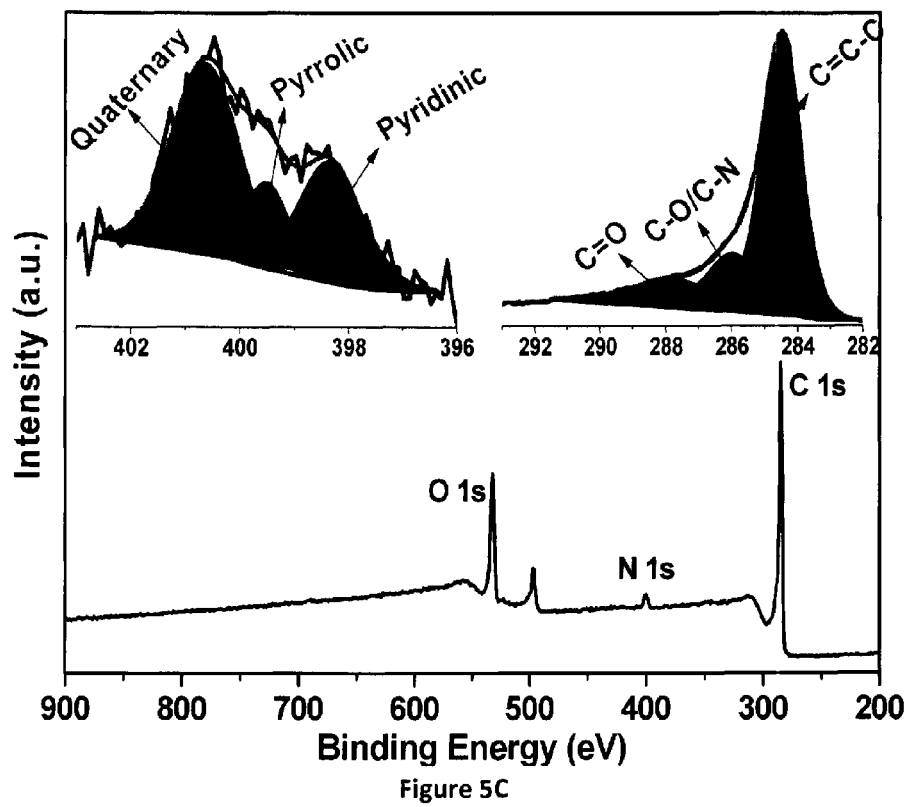
Figure 5D:
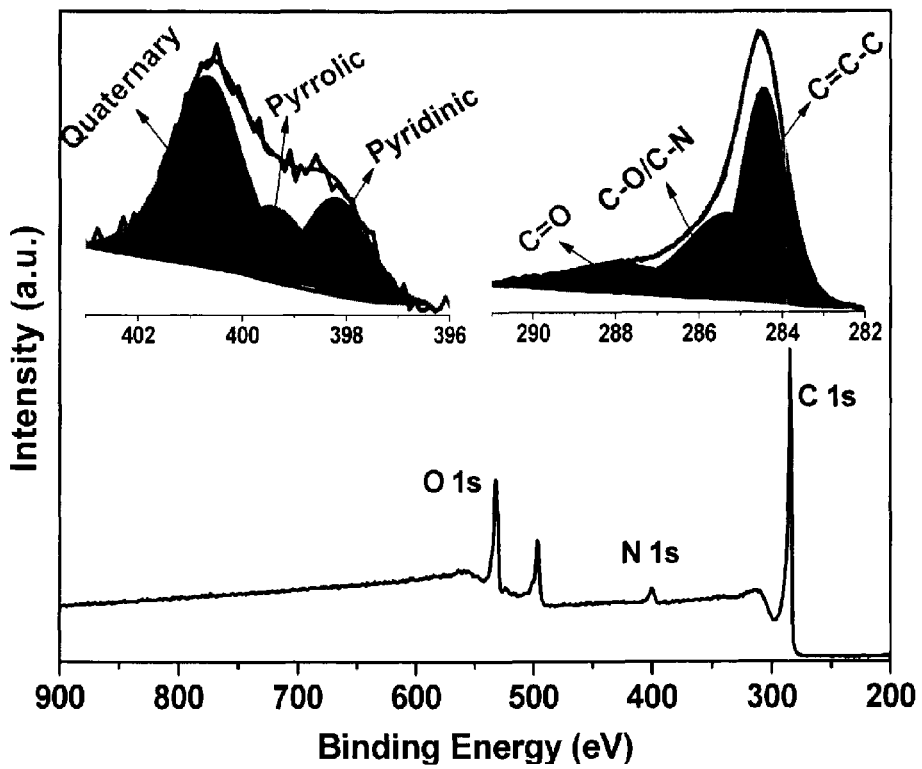
Figure 5E:
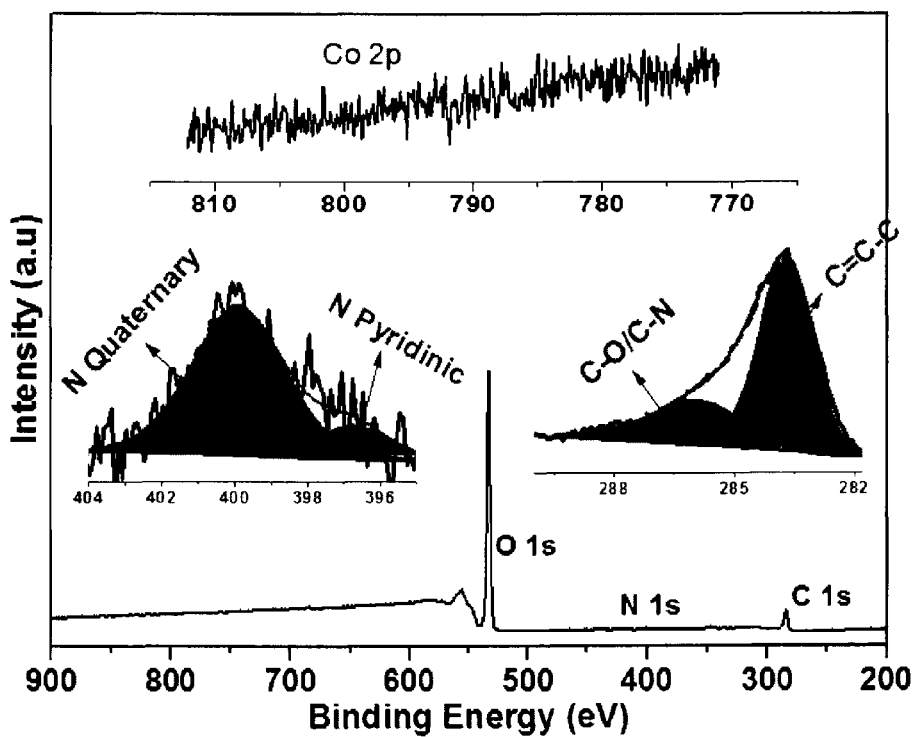
Figure 5F:
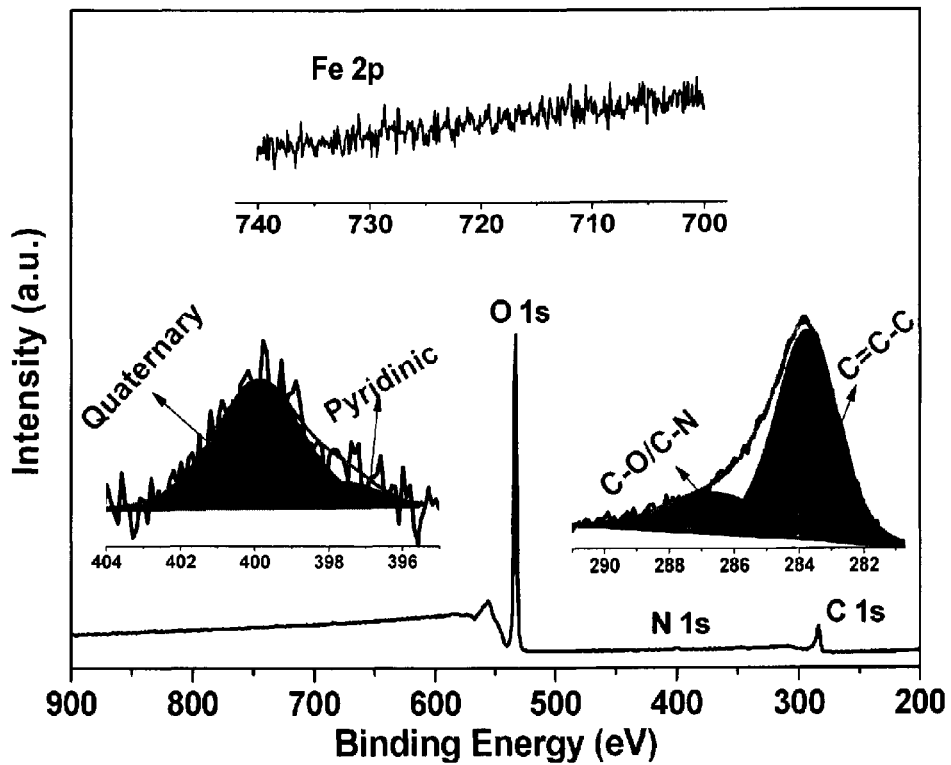

FIGS. 5A, 5B, 5C, and 5D provide x-ray photoelectron spectroscopy (XPS) survey spectra of the PDMC-600° C. (FIG. 5A), PDMC-700° C. (FIG. 5B), PDMC-800° C. (FIG. 5C), and PDMC-900° C. (FIG. 5D), respectively, with the N 1s and C 1s spectra shown in inset. FIG. 5E provides the XPS survey spectrum of the PDMC-Co, with the N 1s, C 1s and Co 2p spectra shown in inset. FIG. 5F provides the XPS survey spectrum of the PDMC-Fe, with the N 1s, C 1s and Fe 2p spectra shown in inset.

Figure 6:
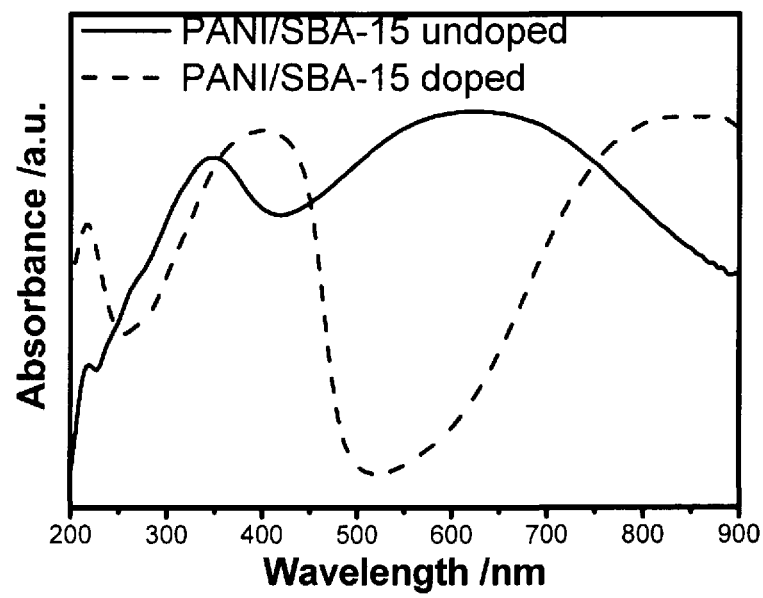

FIG. 6 provides the ultraviolet-visible (UV/Vis) spectra of undoped and H+-doped PANI/SBA-15 materials.

Figure 7:
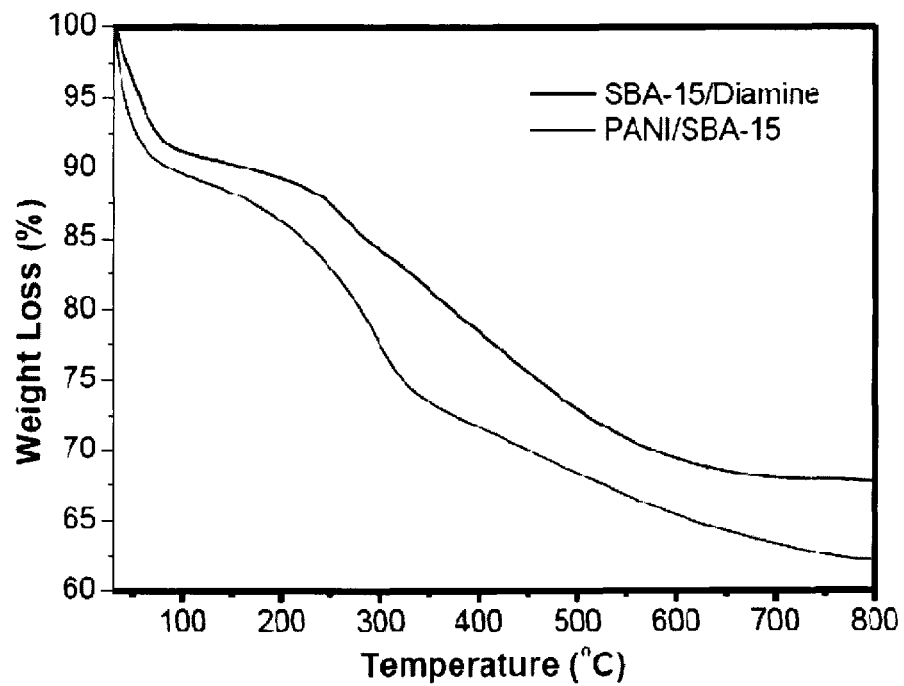

FIG. 7 provides thermogravimetric analysis (TGA) curves of SBA-15 and SBA-15/PANI.

Figure 8:
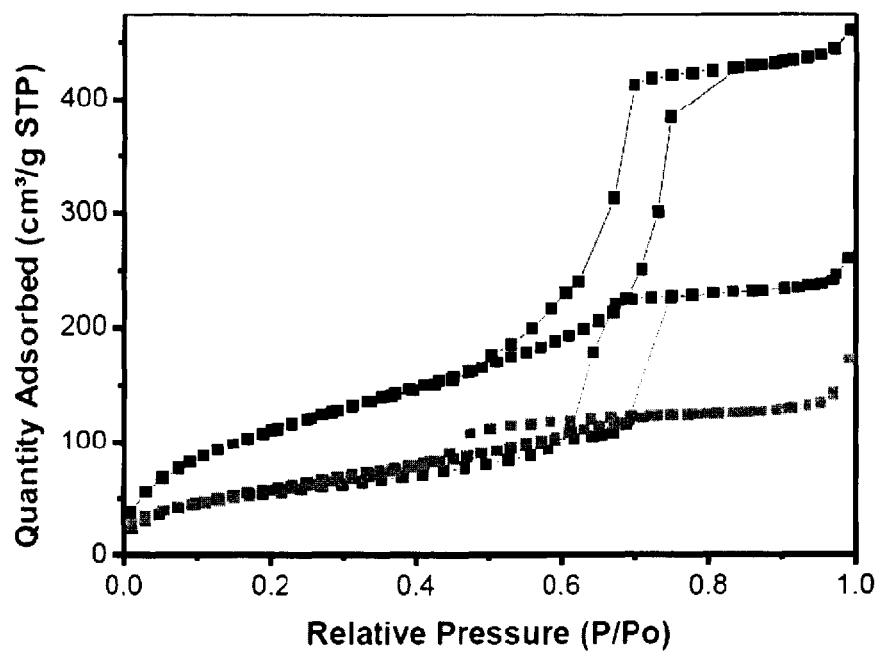

FIG. 8 provides $N_2$ adsorption/desorption isotherms of SBA-15 (black), SBA-15/Diamine (dark grey), and PANI/SBA-15 (light grey).

Figure 9:
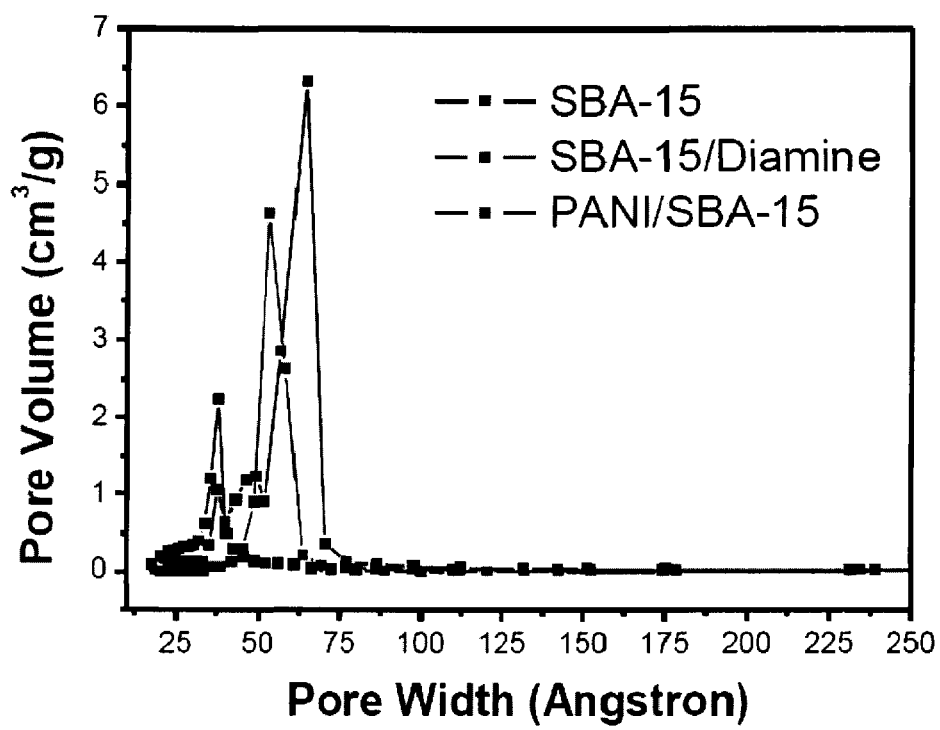

FIG. 9 provides pore size distribution graphs of SBA-15, SBA-15/Diamine, and PANFSBA-15 nanocomposite.

Figure 10:
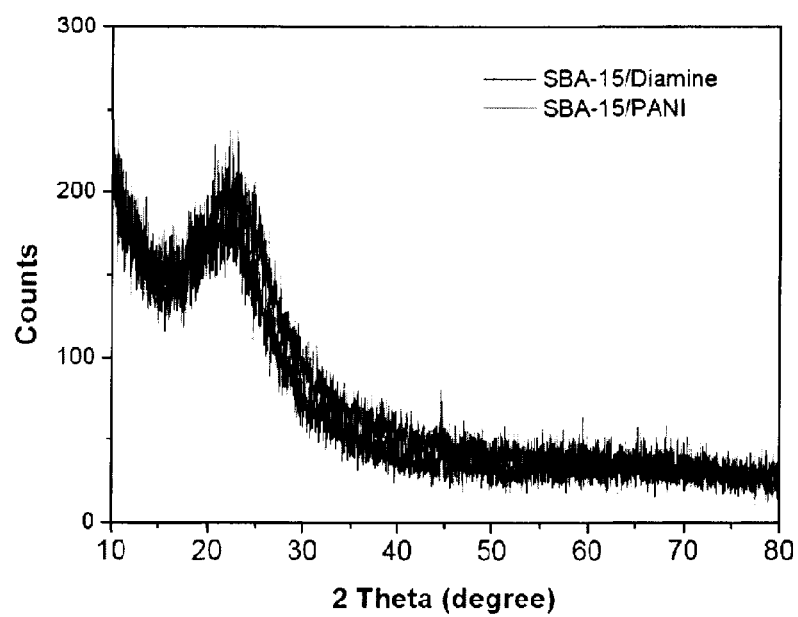

FIG. 10 provides powder X-ray diffractograms (PXRD) of SBA-15 modified with N-(2-aminoethyl)-3-aminopropyltrimethoxysilane (SBA-15/Diamine) and after the polymerization of aniline inside its pores (PANI/SBA-15).

FIGS. 11A and 11B provide low resolution and high resolution transmission electron microscope (TEM) images of PANI/SBA-15, respectively.

Figure 12:
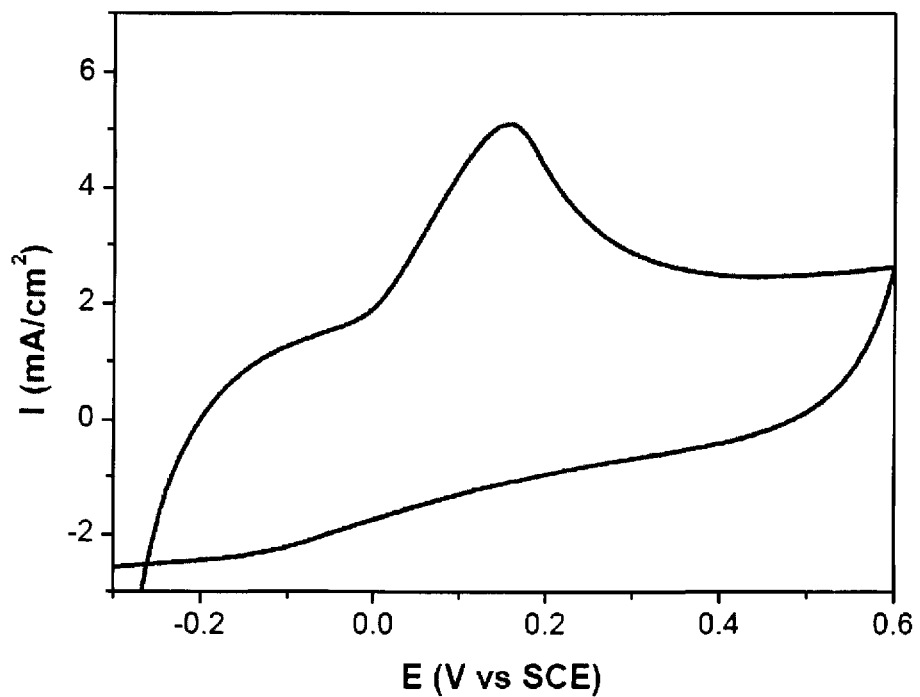

FIG. 12 provides cyclic voltammetric responses for Pt/C in 0.5 M aqueous $H_2SO_4$ solution in the presence of 10 mM L-ascorbic acid at scan rates of 100 mV $s^{-1}$.

Figure 13:
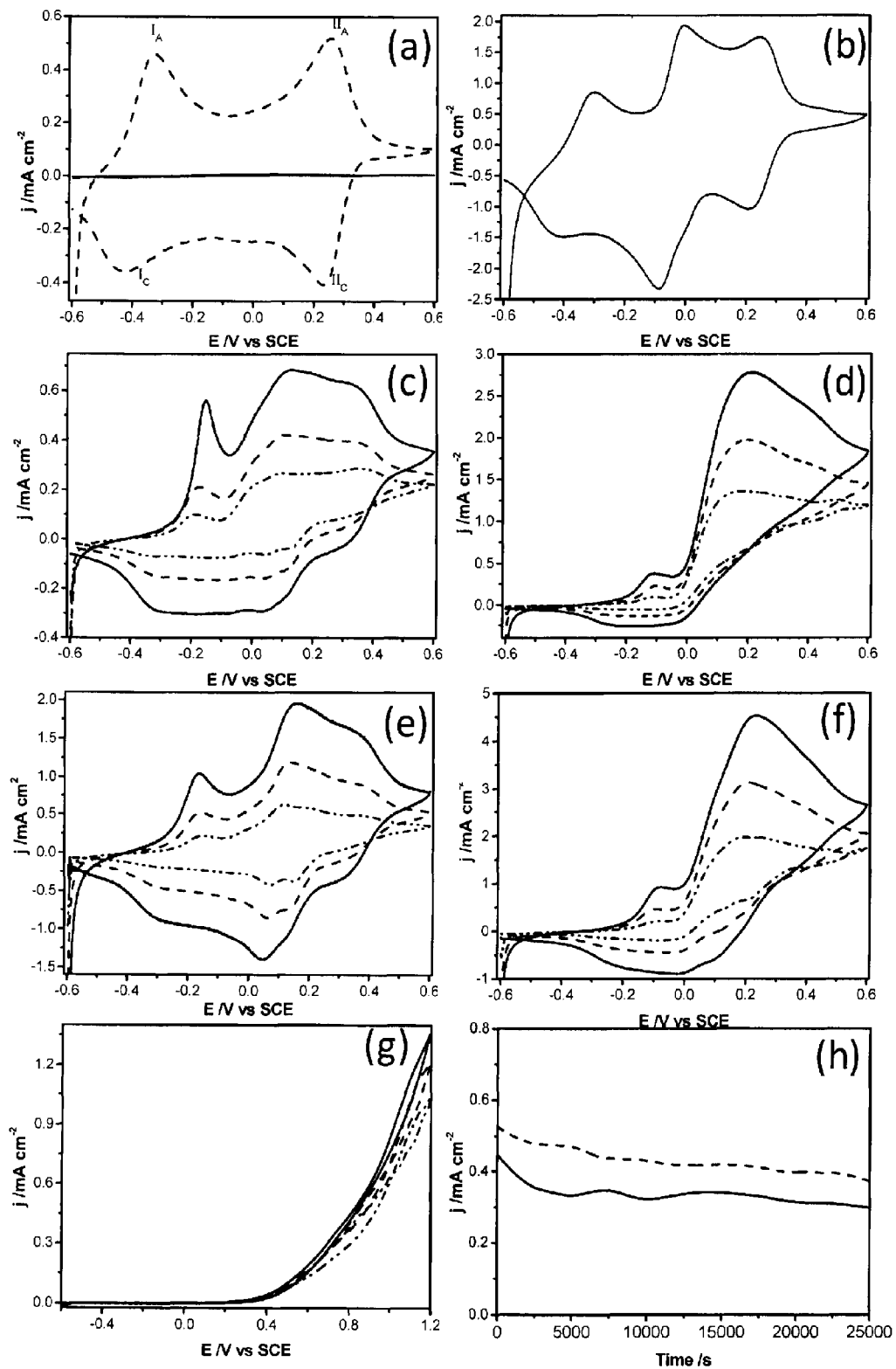
Figure 13I:
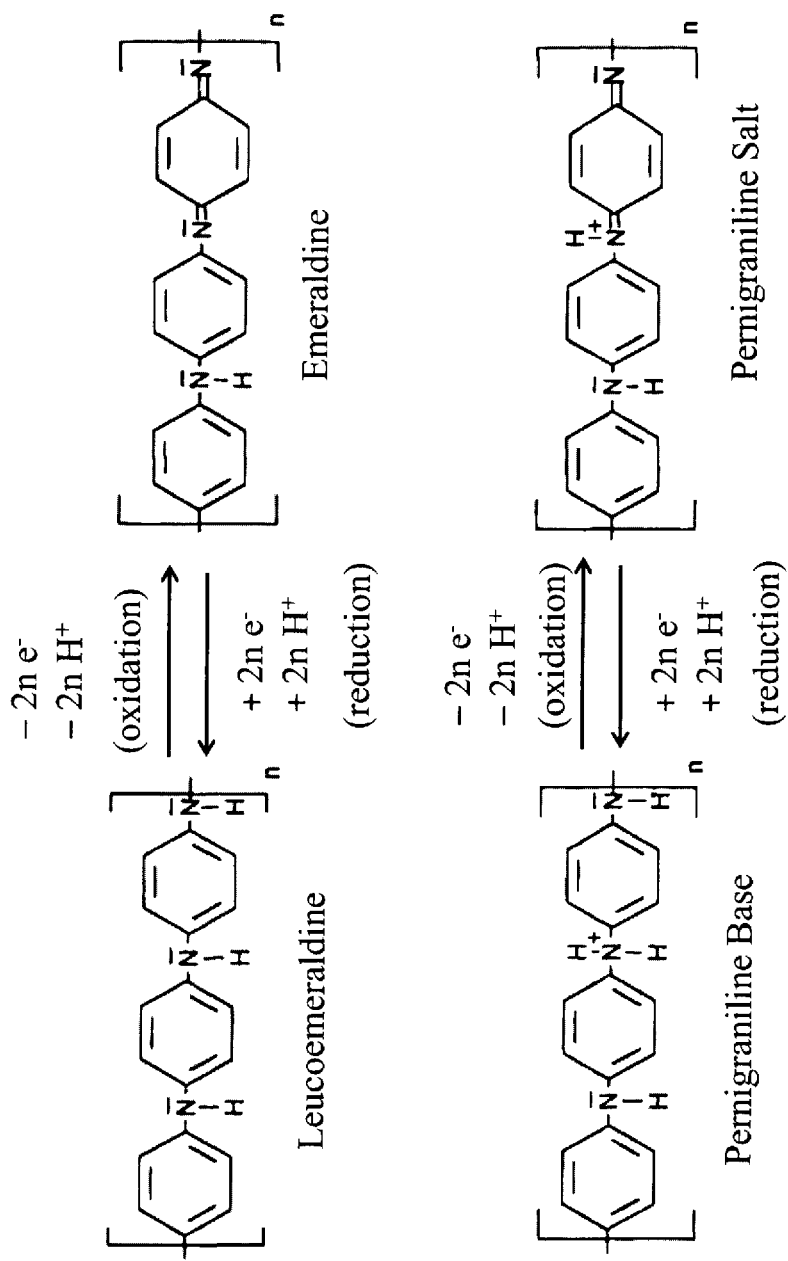

FIG. 13A provides cyclic voltammetric (CV) responses of bare carbon paste electrode (CPE) (-) and CPE coated with PANI/SBA-15 (- - -) in 0.5 M $H_2SO_4$ solutions at scan rate of 100 mV $s^{-1}$. FIG. 13B provides CV responses of Co(II)-doped PANI/SBA-15 in 0.5 M $H_2SO_4$ at scan rate of 100 mV $s^{-1}$. FIGS. 13C and 7D provide CV responses of PANI/SBA-15 in 0.5 M aqueous $H_2SO_4$ solution in the presence of 1 mM and 10 mM L-ascorbic acid, respectively, at different scan rates: 100 mV $s^{-1}$ (-) 50 mV $s^{-1}$ (- - -) and 20 mV $s^{-1}$ (- -). FIGS. 13E and 13F provide CV responses of Co(II)-doped PANI/SBA-15 in 0.5 M aqueous $H_2SO_4$ solution in the presence of 1 mM and 10 mM L-ascorbic acid, respectively, at different scan rates: 100 mV $s^{-1}$ (-) 50 mV $s^{-1}$ (- - -) and 20 mV $s^{-1}$ (- -). FIG. 13G provides CV responses of bare CPE in 0.5 M aqueous $H_2SO_4$ solution in the presence of 10 mM L-ascorbic acid at different scan rates: 100 mV $s^{-1}$ (-), 50 mV $s^{-1}$ (- - -) and 20 mV $s^{-1}$ (- -). FIG. 13H provides chronoamperometric results of L-ascorbic acid oxidation in a 25 mL solution containing 10 mM L-ascorbic and 0.5 M $H_2SO_4$ using PANI/SBA-15 (-) and Pt/C (- - -) as electrocatalysts. The current densities are reported considering the geometric area of the electrodes. FIG. 13I provides the redox processes in different forms of PANI.

Figure 14:
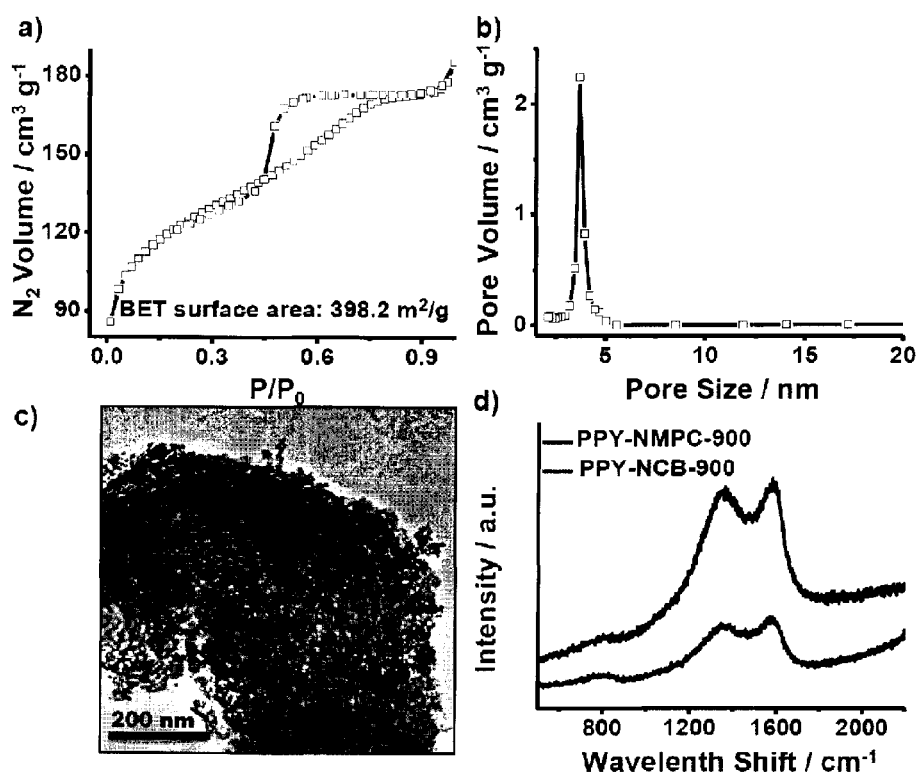

FIGS. 14A-14D provide a characterizations of PPY-NMPC-900. FIG. 14A provides $N_2$ adsorption/desorption isotherms. FIG. 14B provides BJH pore size distributions. FIG. 14C provides a TEM image. FIG. 14D provides FT-Raman spectra of PPY-NMPC-900 (top curve) and PPY-NCB-900 (bottom curve).

Figure 15:
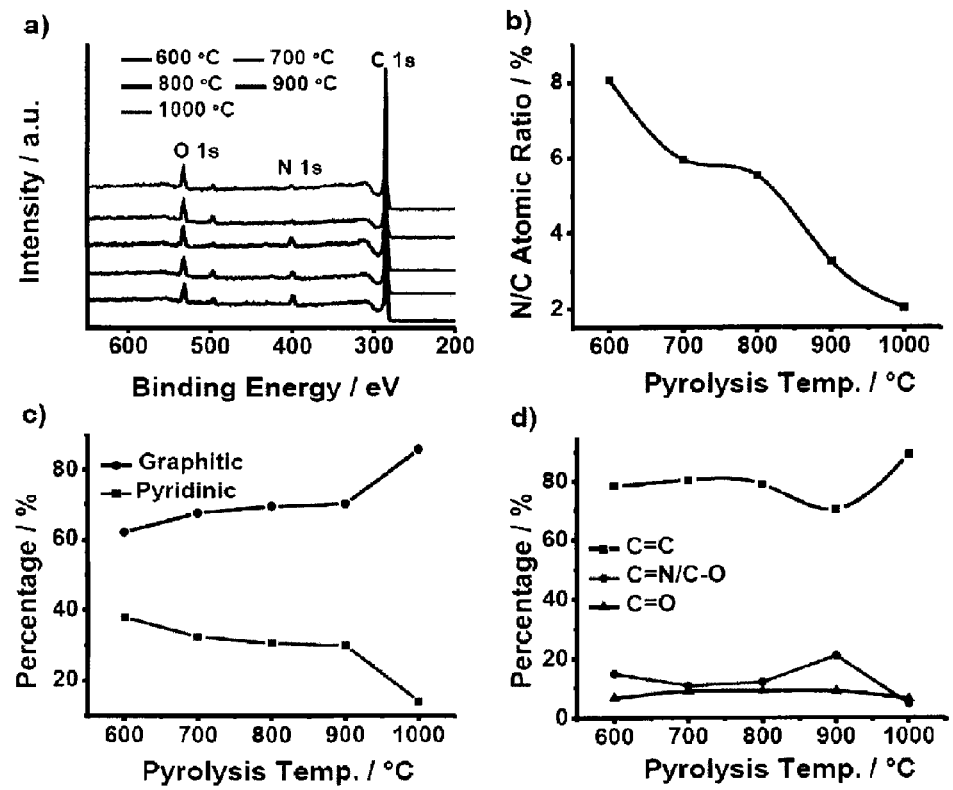

FIGS. 15A-15D provide XPS results for different PPY-NMPCs as a function of pyrolysis temperatures. FIG. 15A provides survey spectra. FIG. 15B provides N/C atomic ratios. FIG. 15C provides atomic content of different types of N. FIG. 15D provides atomic content of different types of C.

FIGS. 16A-16D provide electrochemical and electrocatalytic properties of PPY-NMPCs. FIG. 16A provides cyclic voltammograms with the scan rate of 10 mV/s at pH 7.4 in 0.1M PBS solution with different concentrations of hydrazine (from 10 mM to 100 mM) in presence of on PPY-NMPC-900. FIG. 16B provide cyclic voltammograms at different scan rates (ranging from 10 mV/s to 100 mV/s), with 50 mM hydrazine at pH 7.4 in 0.1M PBS solution PPY-NMPC-900. FIG. 16C provides current density in 0.1M PBS solution with 50 mM hydrazine at three different potentials for PPY-NMPCs, prepared at different pyrolysis temperatures. FIG. 16D provides the overpotential of 50 mM hydrazine electrooxidation in 0.1 mM PBS (pH=7.4) solution for PPY-NMPCs.

DETAILED DESCRIPTION OF THE INVENTION

Herein, the synthesis of novel PANI-derived metal-free N- and O-doped mesoporous carbon (PDMC) is described. The metal-free PDMC was found to electrocatalyze ORR very efficiently and with higher current density, lower overpotential, and higher stability than the Pt/C electrocatalysts. The material was synthesized by carbonization under inert atmosphere of PANI/SBA-15 mesoporous silica, which was prepared by polymerization of PANI in situ within the pores of SBA-15 (see, e.g., FIG. 1).

PANI was chosen as a precursor in this work for a number of reasons. The nature of N species in the N-doped carbons synthesized from the carbonization of polymers can depend on the nitrogen functional group in the precursors (Gojkovic et al. (1998) J. Electrochem. Soc., 145:3493). Therefore, the choice of the polymers or their molecular precursors is important for the properties of the final carbon-based materials. In this regard, PANI is an attractive precursor for making N-doped carbons owing to its high N/C ratio (0.167) and high molar weight, which prevents its vaporization at high temperatures. Hence, upon carbonization, even without a nitrogen rich atmosphere, PANI often leads to N-doped carbons with high nitrogen content, and thereby better electrocatalytic activity (Byon et al. (2011) Chem. Mater., 23:3421). Moreover, by pyrolyzing bulk PANI under ammonia atmosphere, more N atoms could be doped into the resulting carbon materials, if necessary (Zhong et al. (2012) J. ChemSusChem, 5:1698). In addition, bulk PANI doped with metals or bulk PANI made from modified aniline monomer have been shown to form catalytic active carbons (Wu et al. (2011) Science, 332:443; Gavrilov et al. (2012) J. Power Sources, 220:306).

Despite these appealing features of PANI, however, the pyrolysis of PANI can also form small CN species that can escape and lead to low nitrogen content in the resulting carbon materials (Hacaloglu et al (2008) J. Appl. Polym. Sci., 108: 400). The latter, in turn, could be detrimental to some of the properties of the final material. The possible loss of nitrogen species during pyrolysis of PANI could be minimized by trapping the PANI or its molecular precursors within robust nanocavities before pyrolysis (Paraknowitsch et al. (2010) Adv. Mater., 22:87). Trapping PANI or its molecular precursors within thermally robust nanocavities during the synthesis of N-doped carbon nanomaterial can also have other advantages; e.g., it allows the synthesis of carbon nanomaterials with controlled shapes (Silva et al. (2012) Angew. Chem. Int. Ed., 51:7171; Zhi et al. (2005) Am. Chem. Soc., 127:12792; Zhi et al. (2005) J. Am. Chem. Soc., 127:12792). Thus, the confined nanosized channel pores of SBA-15 were chosen here as a template to trap and pyrolyze PANI; i.e., to obtain carbon materials that not only have high surface area but also possess high N content. Interestingly, besides these advantages, the final material was also found to contain significant amount of oxygen, thanks to the oxygen implantation by the mesoporous silica template, and thereby exhibited higher electrocatalytic activity toward ORR.

As stated hereinabove, the oxygen reduction reaction (ORR) remains one of the most challenging problems plaguing fuel cells from getting a wide range of applications today. This is because ORR is inherently a sluggish reaction and has a very high overpotential even with the best known electrocatalyst platinum. This problem is exacerbated by the unavailability of inexpensive and sustainable ORR electrocatalysts that are not only very good but also are based on earth abundant elements. The novel carbon-based materials of the instant invention provide solutions to both of these problems associated with ORR. Mesoporous oxygen- and nitrogen-doped carbons that can serve as efficient metal-free multifunctional electrocatalysts for ORR were synthesized from in situ polymerized mesoporous silica-supported polyaniline (PANT) by subjecting the composite material to different high temperatures to undergo carbonization. After etching away the mesoporous silica template, PANI-derived mesoporous carbons (PDMC) were obtained, which were then successfully applied as electrocatalyst for ORR. The PDMC that was synthesized at 800° C., in particular, exhibited an outstanding electrocatalytic activity towards ORR. Without being bound by theory, this unprecedented high electrocatalytic activity exhibited by these materials may be attributed to the possible synergetic activities by the nitrogen atoms present in the materials and the surface oxygen (or hydroxyl) species implanted in them from the silica template.

Herein, novel polymer-derived mesoporous carbons, such as polyaniline-derived mesoporous carbons (PDMC), are provided. The structures are doped with nitrogen and oxygen or other heteroatom and exhibit very high electrocatalytic activities. These nanomaterials are useful as highly efficient metal-free electrocatalysts and may be used for fuel cells and in catalysis. For simplicity, the polymer-derived mesoporous carbons are largely described hereinbelow as polyaniline-derived mesoporous carbons (PDMC), although other polymers may be substituted for the polyaniline, as described throughout the application.

The instant invention provides PDMCs with unexpectedly superior properties, namely very high electrocatalytic activity. In a particular embodiment, the PDMCs of the instant invention are not doped with metal. While the PDMCs are described herein as being metal free, the PDMCs may comprise small or trace amounts of metal (e.g., by contamination). In a particular embodiment, the PDMCs comprise less than about 2 wt %, less than about 1 wt %, less than about 0.5 wt %, less than about 0.1 wt % of metal, or no metal at all.

Compositions comprising at least one polymer-derived mesoporous carbon (e.g., PDMC) of the instant invention and at least one carrier are also encompassed by the instant invention. The instant invention also encompasses fuel cells comprising at least one polymer-derived mesoporous carbon (e.g., PDMC) of the instant invention (e.g., as part of a cathode and/or anode of a membrane electrode assembly).

The instant invention also encompasses methods of catalyzing a chemical reaction with a polymer-derived mesoporous carbon (e.g., PDMCs) of the instant invention. The polymer-derived mesoporous carbon (e.g., PDMCs) may be used to catalyze, for example, oxidation or reduction reactions such as the oxygen reduction reaction, $CO_2$ reduction, hydrogen evolution, hydrazine oxidation reaction, and electro-oxidation reactions of organic compounds and the like. In a particular embodiment, the PDMCs of the instant invention are used to catalyze the oxygen reduction reaction in a fuel cell. In addition, the PDMC may also be used in an energy storage device, such as active material in electrochemical capacitors and as anode for lithium ion batteries.

The polymer-derived mesoporous carbons of the instant invention may be synthesized by heating (e.g., until carbonization or pyrolyzation) of polyaniline or derivatives thereof or other N— or non-N containing polymers (including, e.g., boron or sulfur containing polymer) in a mesoporous template and recovering the polymer-derived mesoporous carbons from the template. Indeed, while polyaniline is exemplified throughout the instant application as the polymer, other N— or non-N containing polymers or polyaniline derivatives may be used in any of the compositions, methods, and/or embodiments of the instant invention, particularly conductive polymers. For example, Example 3 provides polypyrrole-derived mesoporous carbons. Examples of other polymers include, without limitation, polyfluorene (PFO), polypyrrole, polythiophene (PT), poly(p-phenylene vinylene) (PPV), polycarbazole, polyindole, polyazepine, poly(3,4-ethylenedioxythiophene), poly(p-phenylene sulfide), polyacetylene, polyphenylene, polypyrene, polyazulene, polynapthalene, and derivatives thereof, particularly polypyrrole, polythiophene (PT), poly(p-phenylene vinylene) (PPV), or derivatives thereof. Notably, the polymer-derived mesoporous carbons derived from polymers other than polyaniline may catalyze chemical reactions (e.g., other than those catalyzed by PDMCs) such as oxygen reduction reactions and/or hydrazine oxidation reactions.

The term "mesoporous" indicates that the material contains pores with diameters between about 1 and about 50 nm. In a particular embodiment, the mesoporous template is mesoporous silica or any other mesoporous metal oxide (see below). Types of mesoporous silica include, without limitation, MCM- (e.g., MCM-41, MCM-48), SBA- (e.g., SBA-15, SBA-1, SBA-16), MSU- (e.g., MSU-X, MSU-F), KSW- (e.g., KSW-2), FSM- (e.g., FSM-16), HMM- (e.g., HMM-33), and TUD (e.g., TUD-1) mesoporous silica. The mesoporous hard template can also include organic-functionalized mesoporous silicas and periodic mesoporous organosilicas with different organic groups (e.g., without limitation, ethane PMO, ethane PMO, benzene PMO, etc.). These materials can be functionalized with organoamine and polyaniline groups and produce PDMCs in the same manner as above. The mesoporous hard template can also be mesoporous titania, mesoprous ceria, vanadia, etc., which can also be functionalized with polyaniline and undergo carbonization to produce PDMC materials. The etching of the metal oxides in these cases may be achieved with acidic solutions. Core-shell nanoporous silica and other metal oxide may also serve as hard templates for making similar PDMC materials. In a particular embodiment, the template comprises pores ranging between about 1 to about 50 nm in any part of their structures (e.g., the pores can be synthesized by carbonization followed by etching). In a particular embodiment, the pores of the template allow for functionalization with amine and/or polyaniline. In a particular embodiment, the mesoporous silica is SBA-15.

As explained hereinbelow, the pyrolysis temperature used in the methods of synthesizing the PDMCs yields PDMCs of different characteristics and shapes. In a particular embodiment, the PDMCs are synthesized at a temperature greater than about 600° C., greater than about 650° C., greater than about 700° C., or greater than about 750° C. In a particular embodiment, the PDMCs are synthesized at a temperature between about 600° C. and about 1000° C., between about 700° C. and about 900° C., between about 750° C. and about 850° C., between about 775° C. and about 825° C., or at about 800° C. The heating may be performed in an inert atmosphere (e.g., argon). The heating may occur slowly (e.g., about 0.5° C./min to about 5° C./min, particularly about 1° C./min) and/or in stages. For example, the sample may be first slowly heated to a first temperature (e.g., about 150° C. to about 250° C., particularly about 200° C.), slowly heated to a second temperature (e.g., about 250° C. to about 350° C., particularly about 300° C.), and then rapidly (e.g., about 7° C./min to about 20° C./min, particularly about 10° C./min) heated to the final pyrolysis temperature. The temperature may be maintained at the individual temperatures for about 0.5 to about 5 hours or more, particularly for about 2 hours. The sample may then be rapidly cooled.

The PDMCs are recovered from the mesoporous template. In a particular embodiment, the template is dissolved away without damage to the PDMCs. For example, when the template is mesoporous silica, the silica template may be removed by etching (e.g., treating with a base such as KOH or NaOH). For non-silica-based mesoporous templates, other etchants can be used, such as acidic solutions (e.g., $H_2SO_2$, HCl, etc.).

In a particular embodiment of the instant invention, the polyaniline is polymerized within the mesoporous template (e.g., in situ). In a particular embodiment, the method comprises: 1) coating the mesoporous template with cationic groups (e.g., diamine groups), 2) contacting the mesoporous template with persulfate (which become electrostatically immobilized), and 3) contacting the mesoporous template with a polyaniline precursor (e.g., aniline) under acidic conditions. In a particular embodiment, the reagents are added to the interior of the channels/pores of the mesoporous template. The method may further comprise washing the resultant solid material (e.g., with acetone:ethanol and/or a base (e.g., ammonia)). The mesoporous template may be coated with diamine groups by first coating the mesoporous template with trimethylsilyl groups and then contacting the template with diaminosilane. The methods of the instant invention may further comprise doping with other compounds including metals, but as explained herein, the characteristics of the metal-free PDMCs are superior for fuel cell use. An example of the synthesis process is schematically provided in FIG. 1.

Definitions

The following definitions are provided to facilitate an understanding of the present invention:

The singular forms "a," "an," and "the" include plural referents unless the context clearly dictates otherwise.

As used herein, the term "catalyst" refers to a substance that increases the rate of a chemical reaction while not being consumed in the reaction.

A "carrier" refers to, for example, a diluent, preservative, buffer, antioxidant, water, aqueous solution, salt or saline solution, polysaccharide solution, or combination thereof, or any other vehicle/solution/liquid with which a catalyst of the present invention can be contained.

As used herein, the term "nanoparticles" refers to a discrete particle or crystal with at least one dimension having a size between about 1 nm to about 1000 nm, particularly about 1 nm to about 50 nm. The nanoparticles may be any shape including, for example, sphere-, rod- or rice-like.

The term "isolated" refers primarily to the sufficient separation from other compounds from/with which a compound was chemically synthesized or otherwise generated, so as to exist in "substantially pure" form. "Isolated" is not meant to absolutely exclude artificial or synthetic mixtures with other compounds or materials, or the presence of impurities that do not interfere with the fundamental activity, and that may be present, for example, due to incomplete purification, or the addition of stabilizers, carriers, or other compounds.

The following examples provide illustrative methods of practicing the instant invention, and are not intended to limit the scope of the invention in any way.

Example 1

Electrocatalysts that are capable of catalyzing oxidation of organic compounds have enormous appeal because of their potential applications in fuel cells as well as organic syntheses (Liu et al. (2010) Adv. Mater., 20:2148; Li et al. (2010) Carbon, 48:995; Shao et al. (2005) Nature, 435:795; Dumitrescu et al. (2009) Adv. Mater., 21:3105; Leonard et al. (2011) Chem. Mater., 23:1136; Zhang et al. (2011) Nanotechnol., 22:015602; Zhang et al. (2006) Power Sources 156:171; Sarkar et al. (2008) J. Phys. Chem., 112:12037; Ganesan et al. (2005) Angew. Chemie, Int. Ed., 44:6557; Shao et al., J. Fuel Cell Sci. Tech. 7:021016; Rosca et al. (2009) Chem. Rev., 109:2209; Coutanceau et al. (2008)

Electrochim. Acta 53:6865; Elinson et al. (2008) Adv. Synth. Catal., 350:591). Moreover, when used in chemical reactions for organic synthesis, oxidation electrocatalysts have advantages compared to conventional oxidation catalysts because the former enable 'greener' processes by avoiding the use of sacrificial oxidizing agents that often lead to undesired byproducts (Palmisano et al. (2006) Adv. Synth. Catal., 348:2033; Comninellis (1994) Electrochim. Acta, 39:1857; Biboum et al. (2010) Materials, 3:741). However, despite these potential advantages, the use of electrochemical catalysts in oxidation reactions for synthetic purposes is not a very well explored research field.

On the other hand, in the past few years, a number of fuel cells based on oxidative electrocatalytic systems have been designed and demonstrated to work using methanol (Ou et al. (2011) Langmuir 27:3859; Kua et al. (1999) J. Am. Chem. Soc., 121:10928; Yu-Guo et al. (2008) Adv. Mater., 20:2878; Jusys et al. (2003) Langmuir 19:6759; Li et al. (2010) Int. J. Hydrogen Energy 35:2530), methane (Shao et al. (2006) J. Power Sources 168:589; Chan et al. (2005) J. Electrochem. Soc., 152:A594), ethanol (Zhang et al. (2009) Chem. Commun., 2:195; Mahendiran et al. (2011) Mater. Chem. Phys., 128:341; Vigier et al. (2004) J. Appl. Electrochem., 34:439), hydrazine (Asazawa et al. (2007) Angew. Chem. Int. Ed., 46:8024; Chinchilla et al. (2011) J. Am. Chem. Soc., 133:5425), formic acid (Ji et al. (2010) Nat. Chem., 2:286; Winjobi et al. (2010) Electrochim. Acta, 55:4217; Yu et al. (2008) J. Power Sources 182:124), and L-ascorbic acid (Fujiwara et al. (2007) J. Power Sources, 167:32; Raman et al. (2008) Nanotechnol., 19:435709) as fuels. However, in all of these cases, high efficiency in the fuel cells was obtained only when expensive noble metal and bimetallic nanoparticles such as PtRu and PtSn supported on carbon were used as the electrocatalysts (Dupont et al. (2006) J. Am. Chem. Soc., 128:9129; Ataee-Esfahani et al. (2010) Chem. Mater., 22:6310; Melke et al. (2010) J. Phys. Chem., 114:5914). Furthermore, most of these nanoparticle-based electrocatalysts have been known to easily aggregate or quickly get poisoned by the oxidation reaction products and thus lose their electrocatalytic activities in the presence of reactants/products (Mu et al. (2011) J. Am. Chem. Soc., 133:1978; Gottesfeld et al. (1988) J. Electrochem. Soc., 135:2651; Saida et al. (2011) Electrochem., 79: 371). Moreover, many of these electrocatalysts do involve expensive and precious metals such as Pt, Au, Pd and Ru (Xu et al. (2009) Adv. Mater., 21:2165; Chu et al. (2011) Adv. Mater., 23:3100; Pan et al. (2011) J. Power Sources 196:6228; Jiang et al. (2009) Adv. Mater., 21:4953; Malheiro et al. (2010) J. Power Sources 195: 7255; Maiyalagan et al. (2010) Power Sources 195:5246; Ataee-Esfahani et al. (2010) Chem. Mater., 22:6310).

Herein, a new in-situ synthetic method is provided for highly active oxidation electrocatalysts that are composed of electroactive/conducting polyaniline (PANT) nanostructures. The nanostructures may be controllably polymerized within the channels pores of mesoporous silica. There are clear benefits and advantages by confining or synthesizing PANI within the pores of the high surface area materials such as mesoporous silica materials (e.g., SBA-15). Generally, when polymers such as PANI are prepared by themselves, they often produce bulk polymers having very low porosity, low surface areas, and small contact areas to interact with solutions. Consequently, such polymers exhibit poor electrocatalytic activities. Conversely, when the polymerization of PANI is controllably performed on the channel walls of nanoporous or mesoporous material, such as silica material (e.g., SBA-15), it forms a uniform and high surface area polymeric structure that is supported over the channel walls of the very high surface area SBA-15. This subsequently produces a PANI/SBA-15 composite material with lots of accessible redox active sites in it and a large contact area to interact with solutions, and hence better electrocatalytic activities.

FIG. 1 shows the schematic illustration of a synthetic procedure employed to make PANI/SBA-15 and Co(II)-doped PANI/SBA-15 materials. First, the internal channel walls of the SBA-15 were modified with diamine groups. Diamine groups were chosen because they could serve as excellent chelating agents for anchoring different redox active transition metal ions on the pore walls of the SBA-15 mesoporous material. Furthermore, the amine groups could easily be converted into ammonium ions, which in turn could be used to electrostatically anchor persulfate ions— the oxidizing agents required for polymerization of aniline into PANI. By subsequent in-situ polymerization of aniline using the immobilized persulfate ions on the channel walls of SBA-15 as oxidizing agents, PANI/SBA-15 was produced. The electrochemical and electrocatalytic properties of the material were then investigated. In addition, the PANI/SBA-15 material was immobilized with other electroactive metal ions, such as $Co^{2+}$ ions, to study the redox properties of metal ions within PANI/SBA-15 and the electrocatalytic activity of metal-doped PANI/SBA-15 materials.

In other synthetic routes to PANI and other polymers within nanoporous materials, including mesoporous silica (Dou et al. (2010) J. Coll. Inter. Sci., 341:353; Zhu et al. (2010) J. Mater. Chem., 20:5123), the monomer (i.e. aniline) is added into the pores of the nanoporous materials prior to the addition of the oxidizing agent (e.g., persulfate ions). Since in this case the oxidizing agents are predominantly in solution, the polymer is formed both within the pores as well as on the walls of the SBA-15 material. In contrast, in the synthesis methods of the instant invention, the oxidizing agents were first placed on the channel walls of the mesoporous material as uniformly as possible, prior to addition of aniline.

The reaction in the synthesis of PANI/SBA-15 involves oxidative polymerization, where persulfate ions within SBA-15 are consumed stoichiometrically by aniline to produce small segments of PANI. These small segments of PANI crosslink to one another via a process akin to condensation polymerization and form a higher molecular weight PANI (He, Y. (2006) Appl. Surf. Sci., 252:2115; Silva et al. (2008) Polymer 49:4066; Silva et al. (2009) Langmuir 25:873; Silva et al. (2009) Cryst. Growth. Des., 9:3307). Because, in the instant synthetic approach, the in-situ polymerization process took place only on channel walls within the one-dimensional long cylindrical shaped pores of SBA-15, it was expected to result in chains of PANI nanostructures with low degree of branching. This was supported indirectly by electrochemical measurements and wide-angle X-ray diffraction (XRD) analysis (vide infra). The specific conductivity of PANI depends greatly on the degree of branching of the polymer, where PANI with low degree of branching gives higher specific conductivity (Langer, J. J. (2000) Synthetic Met., 113:263; Gospodinova et al. (1996) Polymer 37:4431). Therefore, PANI with low degree of branching is often preferred for various electrochemical applications. Good conductivity and electrocatalytic activities for the PANI/SBA-15 materials of the instant invention have been demonstrated, presumably because of the low degree of branching in the polymers. This was corroborated by wide-angle X-ray diffraction (XRD) analysis, which showed the PANI to have an amorphous or nanoscale structure, suggesting low cross-linkages in it. Notably, bulk PANI materials with high degree of branching (e.g., prepared by magnetic stirring of aniline in solutions) typically show sharp Bragg reflections (Liu et al. (2002) Macromolecules 35:9414; Sutar et al. (2007) J. Colloid Interf. Sci., 313:353; Krishna et al. (2009) J. Phys. D, 42:095404; Gupta et al. (2010) J. Appl. Phys., 108:073701).

Methods

Reagents and Materials

Poly(ethylene glycol)-block-poly(propylene glycol)-block-poly(ethylene glycol) ($(PEG)_{20}(PPG)_{70}(PEG)_{20}$) (Pluronic® 123), average molecular weight of 5800 Da, was obtained from BASF (Florham Park, N.J.). Tetraethyl orthosilicate (TEOS), sodium persulfate, aniline, cobalt(II) nitrate ($Co(NO_3)_2$), $FeCl_3$, hexane, hexamethyldisilazane (HMDS), and Pt/C (1% Pt) were purchased from Sigma-Aldrich (St. Louis, Mo.). Hydrochloric acid solution and absolute ethanol (99.99%) were obtained from Fisher Scientific (Waltham, Mass.). N-(2-aminoethyl)-3-aminopropyltrimethoxysilane was acquired from Gelest, Inc. (Morrisville, Pa.).

Synthesis of SBA-15 Mesoporous Silica Functionalized with Organodiamine Groups (SBA-15/Diamine)

SBA-15 was synthesized as reported (Zhao et al. (1998) Science, 279:548-552; Silva et al. (2011) J. Phys. Chem. C, 115:22810-22817). Pluronic® 123 (4 g) was dissolved in a solution containing concentrated HCl (20 mL) and distilled water (130 mL). After the temperature of the solution was adjusted to 45° C., TEOS (8.5 g) was added into it. The solution was vigorously stirred for 20 hours, and after which it was kept in an oven at 80° C. for 24 hours. The as-prepared SBA-15 was recovered by filtration, washed copiously with distilled water and then dried under ambient conditions. Prior to template extraction, the external surface of the as-prepared mesostructured silica, which still contained the Pluronic® 123 in it, was modified with methyl groups by stirring 4 g of it in HMDS/toluene (5 mL/60 mL) solution for 18 hours. This helped the external surface silanol groups of the as-prepared mesostructured silica to be coated with trimethylsilyl ($-SiMe_3$) groups. After this, the Pluronic® 123 template was removed by stirring the $SiMe_3$-functionalized mesostructured silica material (0.5 g) in 100 mL of diethyl ether:ethanol (1:1 ratio) solution for 5 hours. This yielded $SiMe_3$-capped mesoporous SBA-15 (Me-SBA-15). Organodiamine ("diamine") groups were then grafted onto the inner channel walls of the Me-SBA-15 by stirring Me-SBA-15 (0.1 g) in a solution of N-(2-aminoethyl)-3-aminopropyltrimethoxysilane (1.0 mL) and anhydrous toluene (100 mL) for 18 hours at 80° C. The resulting material was washed with copious amount of ethanol, and dried under ambient conditions, giving a sample labeled as SBA-15/Diamine Synthesis of Polyaniline (PANI) within the Pores of SBA-15 (PANI/SBA-15 Nanocomposite Materials)

SBA-15/Diamine (100 mg) was treated with 1M hydrochloric acid (10 mL) containing sodium persulfate (600 mg). After stirring for 2 hours at room temperature, the solid material was recovered from the solution by filtration and washed with distilled water to remove any residual persulfate ions that are not electrostatically immobilized in it. The resulting solid material, denoted as SBA-15/Diammonium-Persulfate, was stirred in a solution containing aniline (150 µL) and 1M hydrochloric acid (10 mL) in an ice bath (0-5° C.) for 4 hours. This led to polymerization of aniline into PANI, as seen by the color changes of the sample from white or light blue to green. The solid material (PANI/SBA-15) was recovered by filtration and washed copiously with acetone:ethanol (1:1 ratio) until the supernatant was no longer colored. It was then treated with 1.0 M ammonia solution (10 mL), filtered, washed several times with distilled water and let to dry under ambient conditions. This gave PANI/SBA-15.

FTIR spectra of the SBA-15 material, SBA-15 after surface modification with diamine groups and SBA-15 after polymerization of polyaniline on the channel walls of its pores were performed. The spectrum for SBA-15 shows two bands with low intensity at ~2958 and ~2280 cm$^{-1}$ that are attributed to the C—H stretching modes. The surface modification by diamine group is confirmed by the appearance of a broad signal at ~1587 cm$^{-1}$ due the N—H bending vibration mode of primary and secondary amines. In addition, a peak centered at ~1479 cm$^{-1}$, which is attributed to the —$CH_2$— bending mode of propyl and ethyl segments of N-(2-aminoethyl)-3-aminopropyl groups, appeared.

Metal-Doped PANI/SBA-15

Cobalt(II), Fe(III) or mixed Cobalt(II)/Fe(III) ions were chelated onto PANI/SBA-15 by stirring PANI/SBA-15 (50 mg) in 0.1 mmol/L aqueous solutions containing the corresponding metal salts (2 mL). The solution was stirred for 6 hours, and after which the solid material was recovered by centrifugation, washed with ethanol, and then dried under ambient conditions. Table 1 provides the metal concentration of the metal-doped PANI/SBA-15 materials.

TABLE 1

Metal concentrations in the metal-doped PANI/SBA-15 materials.

| Sample | [$Co^{2+}$] mmol/g | % | [$Fe^{3+}$] mmol/g | % |
|---|---|---|---|---|
| PANI/SBA-15-[$Co^{2+}$] | 4 | 23.6 | — | — |
| PANI/SBA-15-[$Fe^{3+}$] | — | — | 4 | 22.3 |
| PANI/SBA-15-[$Co^{2+}$]/[$Fe^{3+}$] | 2 | 11.8 | 2 | 11.2 |

Thermal Treatment (Pyrolysis) of PANI/SBA-15 with or without Metals

For the pyrolysis the samples were kept in an alumina boat and placed in a tube furnace under argon atmosphere for the pyrolysis process, with argon flux rate of 30 mL/min. The temperature of the furnace was increase from ambient temperature using a low rate ramp (1° C./min), and with two temperature plateau (200 and 300° C.). The time span in each plateau was 2 hours. After the 300° C. plateau, oven temperature was increased for the final pyrolysis temperature (600, 700, 800 or 900° C.) with a ramp of 10° C./min. The temperature is kept at final pyrolysis temperature for 2 hours and the cooled down with a ramp of 10° C./min.

Silica Etching

After the pyrolysis, the SBA-15 mesostructured silica template from the obtained powder was removed by dissolving the silica in 1 mol/L NaOH solution at 100° C. degree (~10 ng/mL). The solutions were placed in polypropylene sealed vials and kept in an oven at 100° C. for 4 hours to age. After, the powder was removed using high speed centrifugation (12000 rpm-8064 RCF). The powder were repeatedly washed with distilled water and centrifuged until the solutions pH becomes neutral.

Cyclic Voltammetry

Cyclic voltammetry analyses of the samples and electrocatalysis using the materials as electrocatalysts were conducted using a VersaSTAT-3 from PAR (Princeton Applied Research; Oak Ridge, Tenn.) instrument. A three-electrode configuration consisting of a saturated calomel electrode as the reference electrode, a platinum wire (diamete: 0.1 mm) as the counter electrode and powdered sample supported on glassy carbon as the working electrode was employed. The voltammograms were obtained at scan rate of 20 mV s$^{-1}$. The CV was performed in 0.1 KOH solution saturated with oxygen ($O_2$) or nitrogen ($N_2$).

The linear sweep voltammograms for different scan rates was determined. The system was swept in a cathode direction. It was observed that at −0.949 V versus saturated calomel electrode (SCE) reference the interconversion occurs between the hydrogen oxidation reaction and hydrogen evolution reaction. The result indicates that following relation between SCE reference and reversible hydrogen electrode (RHE) scale holds:

$$E_{RHE} = E_{SCE} + 0.949 \text{ V}.$$

All the electrochemical results presented in this work as correct to RHE using the above relation.

Preparation of Working Electrodes 10 mg of the catalyst was added in 2 mL of propanol/water solution (1:3 v/v) with 210 µL of 5% Nafion solution. The catalyst was dispersed to form a catalyst ink by sonication for 30 minutes. The electrodes were prepared by carefully drop casting 4 µL onto a glassy carbon electrode with 5 mm of diameter. The final catalyst load was 100 mg/cm$^2$. The current axes presented in all electrochemical measurements were normalized to the geometrical area of the electrodes.

Rotating Disc Electrode (RDE)

The reaction kinetic was analyzed using a rotate disk electrode (RDE, Pine Research Instrumentation) connected to a Pine Bipotentiostat (Pine Research Instrumentation; Durham, N.C.) assembled with a rotator (Pine Research Instrumentation). Similarly to the cyclic voltammetry, a three-electrode configuration consisting of a saturated calomel electrode as the reference electrode, a platinum wire (diameter: 0.25 mm) as the counter electrode and powdered sample supported on glassy carbon as the working electrode was employed. The working electrode was scanned cathodically at a rate of 5 mV·s$^{-1}$ at RDE experiment with varying rotating speed from 400 rpm to 2,400 rpm. The working electrode was prepared using the method above described.

The number of electrons transferred (n) in the oxygen reduction reaction (ORR) was determined using Koutecky-Levich (K-L) equation:

$$\frac{1}{j} = \frac{1}{j_K} + \frac{1}{j_L} = \frac{1}{j_k} + \frac{1}{B\omega^{1/2}}$$

$$B = 0.62 n F C_0 (D_0)^{2/3} \nu^{-1/6}$$

where $j_k$ is kinetic current, $j_l$ is diffusion-limiting current, n is the overall number of transferred electrons during $O_2$ reduction, F is Faraday constant (96,500 C·mol$^{-1}$), A is the geometric area of the electrode (cm$^2$), k is rate constant for oxygen reduction, Co is the saturated $O_2$ concentration in the electrolyte, $D_O$ is the diffusion coefficient of $O_2$ in the electrolyte, $\nu$ is the kinetic viscosity of the solution, and $\omega$ is the angular frequency of the rotation in terms of rad·s$^{-1}$.

The RDE experiment was performed using 0.1 KOH solution saturated with oxygen. The number of electrons transferred (n) and $j_k$ were obtained from the slope and intercept of the Koutecky-Levich plots (1/j vs $\omega^{-0.5}$) respectively, and by using parameters $C_0$=1.2×10$^{-3}$ mol L$^{-1}$, $D_0$=1.9×10$^{-5}$ cm s$^{-1}$, and $\nu$=0.1 m$^2$s$^{-1}$.

Calibration of Reference Electrode

All electrochemical measurements were carried out using a saturated calomel electrode as reference. The SCE reference electrode as calibrate in the electrolyte solution used in the present work (0.1 mol/L KOH) using the inter-conversion point between the hydrogen oxidation reaction and hydrogen evolution reaction. In this experiment, linear sweep voltammetry were carried out in a three electrode setup using a platinum foil as working electrode (1 cm$^2$ dipped in the solution), a platinum wire (0.25 mm diameter) as a counter electrode and the saturated calomel electrode as reference. The solution (0.1 mol/L KOH) was purged with hydrogen gas prior the analysis for approximately 30 minutes.

Results

The polymerization of PANI within the pores of SBA-15 was carried out generally as reported (Silva et al. (2012) Adv. Mater., 24:1878). As shown in FIG. 1, first, the internal walls of SBA-15 were selectively functionalized with diaminosilane. The amine groups were then converted into ammonium ions using aqueous HCl solution. The resulting supported ammonium ions were used to anchor persulfate ions, which were used to oxidize and initiate the polymerization of aniline into PANI in situ within the pores of mesoporous silica. Besides allowing the formation of N-doped carbon upon pyrolysis, the amine groups within the resulting PANI/SBA-15 also served as a platform to further homogeneously immobilize metal ions within the channel pores of the material; this was easily achieved by stirring the PANI/SBA-15 material with aqueous solutions containing different metal salts. This in turn allowed for easy doping of the final carbon material with different metals and testing of the effects of the metals ions on the structures and electrocatalytic properties of the mesoporous carbon material. Finally, by carbonization of the PANI/SBA-15 material or its metal ion-doped counterparts, followed by etching away the SBA-15 hard template, different N-doped carbons with and without metals, respectively, were obtained. The electrocatalytic activities of all the resulting materials toward ORR were then investigated.

Figure 2:
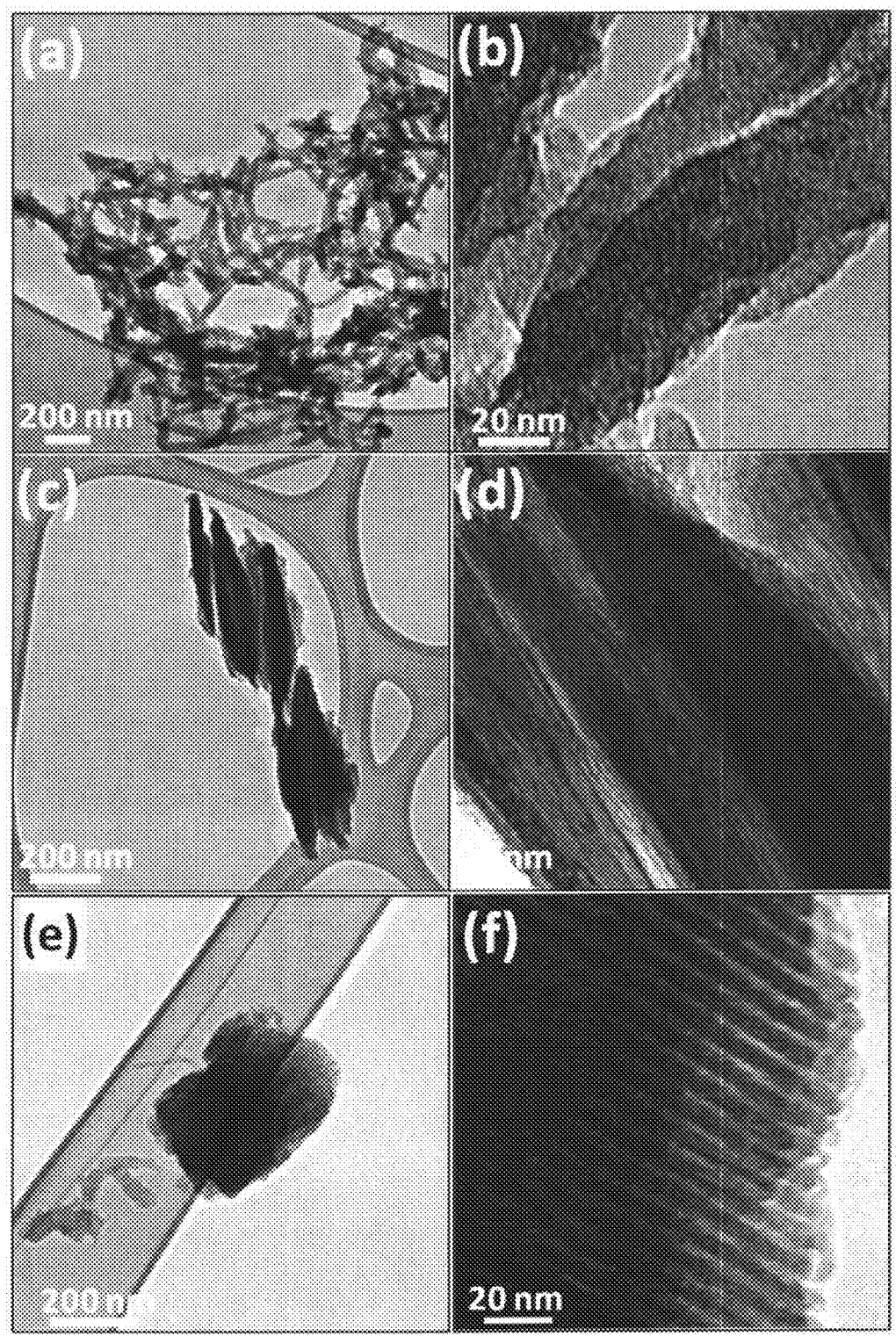

All the carbon materials synthesized here were characterized by various techniques. The results revealed that the morphology of the materials varied greatly depending on the synthetic conditions employed, such as pyrolysis temperatures and time. In FIG. 2, some representative TEM images of some of the N-doped carbons obtained under different temperatures are shown. Whereas the material obtained at 600° C. (FIG. 2A) is composed of well-connected, tubular-shaped nanostructures, the one synthesized at 800° C. (FIG. 2C) appears to be constituted of rice-shaped nanoparticles. When the TEM images of the latter were examined more closely, hierarchical arrangements in the rice-shaped nanoparticles, akin to the characteristic hexagonally ordered channel-like structures of mesoporous silicas (Ding et al. (2011) Micropor. Mesopor. Mater., 142:609), were observed (FIG. 2D). After addition of Co$^{2+}$ ions into the PANI/SBA-15 system, the N-doped carbon obtained at pyrolysis temperature of 800° C. consisted of highly well-aligned mesoporous carbon structures (FIGS. 2E and 2F). It is consistent with the showing that the addition of metals ions into organic molecular precursors or PANI can assist with the formation of highly organized carbon nanostructures during carbonization (Maldonado-Hodar et al. (2000) Langmuir, 16:4367). The influence of pyrolysis temperature as well as addition of metal ions on the morphology of the resulting nanostructured carbon material can also be seen in SEM images.

Figure 3:
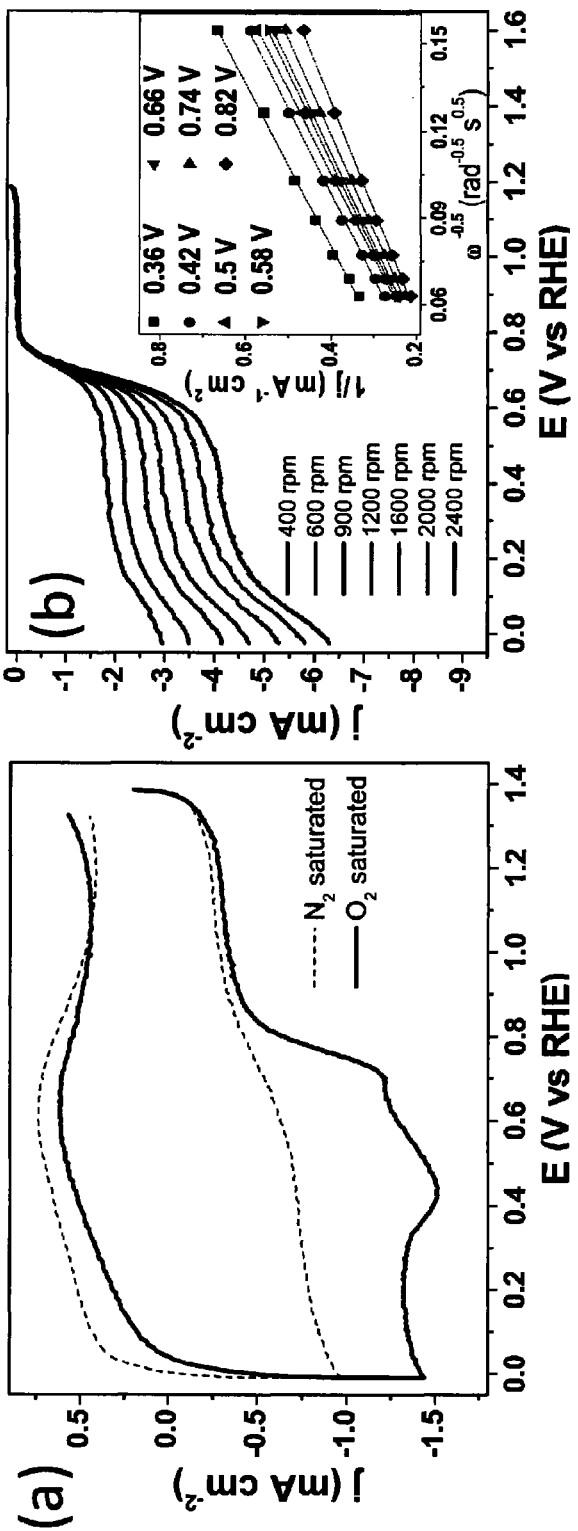
Figure 3:
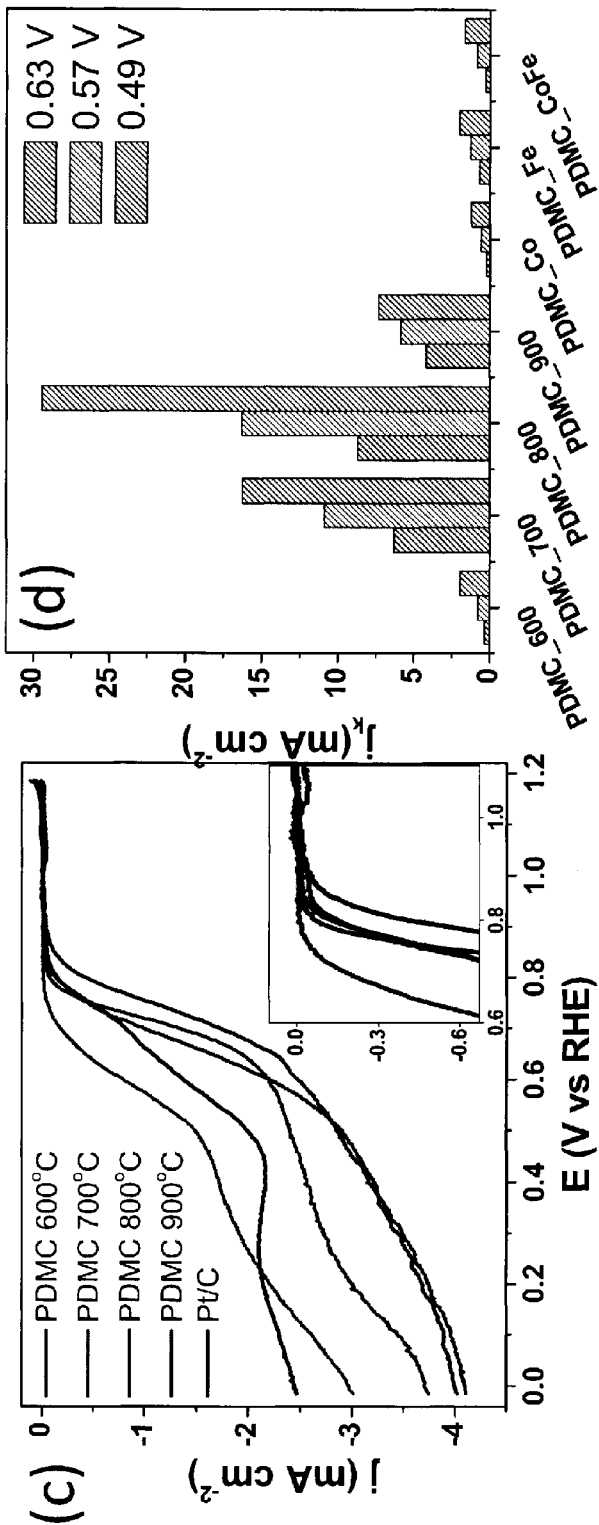
Figure 3:
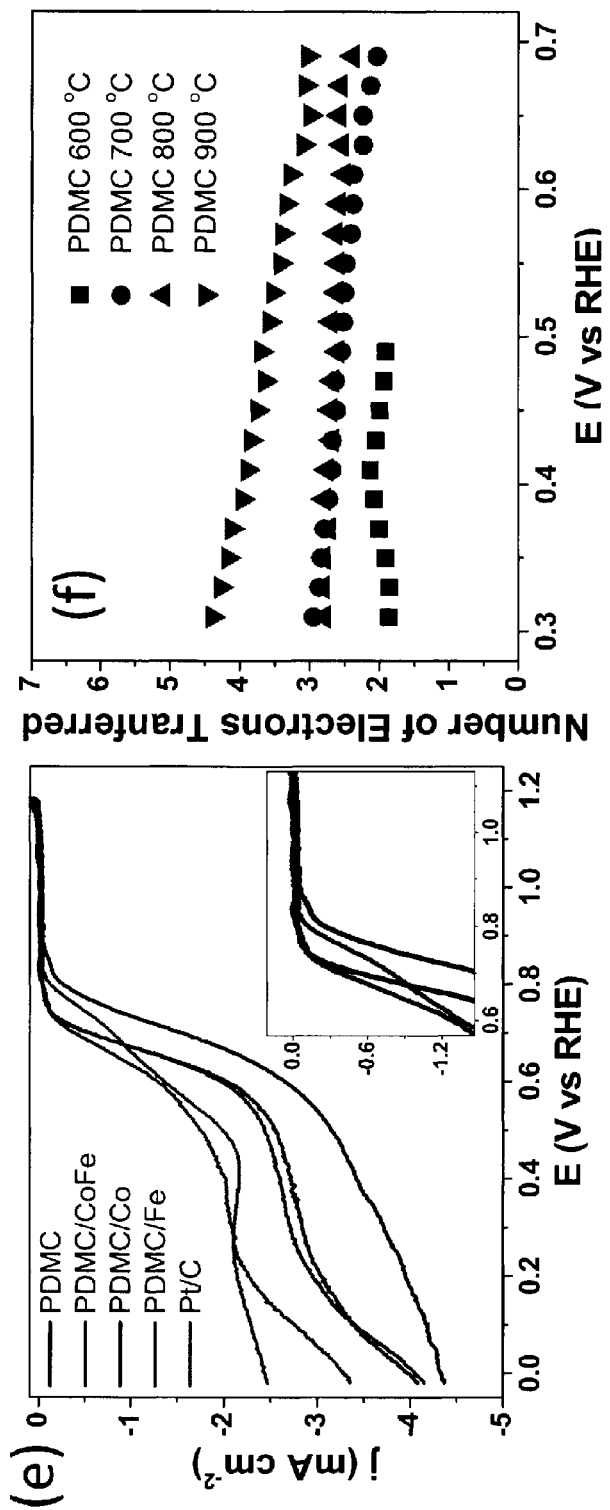

The electrocatalytic activities of the different PDMC materials synthesized above toward ORR was then investigated. First, the catalytic activity of the metal-free PDMC was assessed by cyclic voltammetry in 0.1 mol/L KOH solution saturated with $O_2$ or $N_2$ (FIG. 3). Quick inspection of the cyclic voltammograms for the metal-free PDMC revealed intense oxygen reduction current starting at 0.94 V (vs. RHE) when comparing its cathodic current in oxygen saturated solution with its cathodic current in nitrogen saturated solution (FIG. 3A). Then, the electrocatalytic activity as well as kinetics of the metal-free PDMC toward ORR was analyzed by using a rotating disk electrode (RDE) (FIG. 3B). The corresponding Koutecky-Levich plot, which was obtained from the polarization curves, is depicted as inset in FIG. 3B; the plot is linear, indicating the reaction to be first order in a wide potential range. Examination of the PDMCs prepared at different pyrolysis temperatures revealed that the electrocatalytic activity of the PDMCs toward ORR was directly dependent on their pyrolysis temperatures (FIG. 3C). As can be seen in FIG. 3C, among the materials investigated, the one obtained at 800° C. (i.e., PDMC-800° C.) gave the best performance or the lowest overpotential toward ORR. This value is also, in fact, among the best when compared with any other carbon-based materials reported recently, most of which are graphene-based (Table 2).

TABLE 2

Carbon based materials used as electrocatalysis toward ORR and comparison of their electrocatalytic efficiency based on their onset potentials. By comparison, the mesoporous nitrogen doped carbon of the instant invention is metal free and has an onset potential of 0.94 vs RHE.

| Material (Brief synthetic method used to make the material) | Remark | Onset potential | Ref. |
|---|---|---|---|
| N-doped graphene (obtained by the calcination of GO with melanine) | Metal-Free | −0.1 vs Ag/Ag+ (~0.87 vs RHE) | 1 |
| N-doped graphene(prepared with melanine and soft template F127) | Metal-Free | −0.2 vs SCE (~0.81 vs RHE) | 2 |
| N-dopedmultiwalled carbon nanotubes | Metal-Free | −0.15 vs Hg/HgO (~0.86 vs RHE) | 3 |
| N-doped graphene from carbon nitride | Doped with iron | −0.0 vs Ag/Ag+ (~0.91 vs RHE) | 4 |
| Carbon/cobalt composite | Doped with cobalt | −0.1 vs Ag/Ag+ (~0.87 vs RHE) | 5 |
| Carbon from modified-polyaniline | Metal-free | −0.2 vs Ag/Ag+ (~0.81 vs RHE) | 6 |
| N-doped graphene, doped with iron | Doped with iron | 0.0 Vs Hg/HgO (~0.94 vs RHE) | 7 |
| N-doped graphene It was prepared by the calcinations of GO with pyrrole | Metal-Free | 0.0 Vs Hg/HgO (~0.94 vs RHE) | 8 |
| Nitrogen-doped colloidal graphene quantum dots | Metal-free | −0.2 Vs (SCE) (~0.81 vs RHE) | 9 |
| Co/CoO nanoparticles Assembled on graphene | Doped with CoO | −0.1 V Vs (SCE) (~0.91 vs RHE) | 10 |
| Tridodecylmethylammonium chloride (TDMAC) functionalized reduced graphene oxide | Metal-free | −0.35 vs Ag/Ag+ (~0.62 vs RHE) | 11 |
| Sulfur and nitrogen dual-doped mesoporous graphene | Metal-free | −0.06 vs Ag/Ag+ (~0.91 vs RHE) | 12 |
| Manganese-oxide-containing mesoporous nitrogen-doped carbon | Doped with MnO | 0.9 vs RHE | 13 |
| Nitrogen-doped carbon nanocages | Metal-free | −0.1 V vs Ag/Ag+ (~0.87 vs RHE) | 14 |

1 Lin et at. (2012) Phys. Chem. Chem. Phys., 14: 3381;
2 Sun et al. (2012) J. Mater. Chem., 22: 12810;
3 Sharifi et al. (2012) ACS Nano 10: 8904;
4 Parvez et al. (2012) ACS Nano 11: 9541;
5 Pacuta et al. (2012) J. Power Sources 220: 20;
6 Gavrilov et al. (2012) J. Power Sources 220: 306;
7 Palaniselven et al. (2012) J. Mater. Chem., 22: 23799;
8 Unni et al. (2012) J. Mater. Chem., 22: 23506;
9 Li et at. (2012) J. Am. Chem. Soc. 134: 18932;
9 Guo et al. (2012) Angew. Chem. Int. Ed. 51: 11770;
10 Ahmed et al. (2012) J. Power Sources 218: 168;
11 Liang et al. (2012) Angew. Chem. Int. Ed. 51: 11496;
12 Tan et al. (2012) Adv. Funct. Mater., 22: 4584;
13 Chen et al. (2012) Adv. Mater., 24: 5593.

Besides such factors as current density and overpotential, the selectivity of an electrocatalytic reaction is an important factor to be looked at when designing an electrocatalyst for ORR. Generally, oxygen reduction can occur through two different processes: via a 2-electron process, in which hydrogen peroxide is produced, or via a 4-electron process, which under basic conditions leads to the production of hydroxide ions. Whereas, catalysts with high selectivity to 2-electron process can be exploited for electrocatalytic synthesis of hydrogen peroxide (Fellinger et al. (2012) J. Am. Chem. Soc., 134:4072), electrocatalysts that favor selectivity to the 4-electrons process are highly desired for fuel cells and air battery applications (Wang et al. (2012) ACS Catal., 2:781).

The exact process or the number of electrons transferred in the PDMC-catalyzed electrocatalytic systems were determined by using a rotating disc electrode (RDE) and by making the Koutecky-Levich plots (FIG. 3D). Interestingly, the pyrolysis temperature was once again found to be crucial for the reaction's selectivity. The PDMC prepared at 800° C., for instance, which was found to be the best electrocatalyst and which afforded the lowest overpotential for ORR above, gave a stable electron transfer number with an average value of 2.66 in the potential range it was analyzed. On the other hand, the material prepared at 600° C. gave a stable electron transfer number, with a value of only ca. 2.0. Therefore, despite this material having a relatively higher overpotential and not so suitable for ORR, it still could be an effective electrocatalyst for hydrogen peroxide synthesis because of its electron transfer being ca. 2.0, which suggests that it could be highly selective (ca. 100%) toward hydrogen peroxide product. Interestingly, the highest electron transfer numbers, suggesting higher selectivity toward total oxygen reduction, were obtained with materials treated under higher pyrolysis temperatures. The PDMC synthesized at 900° C., for example, gave an electron transfer number that varied between 3.0 and 4.0 in the potential range of 0.3 to 0.7 V. Notably, the electron transfer number for PDMC-900 at 0.5 V was 3.78; this indicates that the ORR catalyzed by PDMC-900 can be dominated almost exclusively by a one-step four-electron pathway.

To investigate the effect of addition of metal-dopants into the N-doped PDMCs toward the materials' electrochemical properties, cobalt, iron or a mixture of cobalt and iron were immobilized into PANI/SBA-15 before its pyrolysis, as illustrated in FIG. 1. When comparing the polarization curves of the PDMC samples containing metals with the corresponding material containing no metals (i.e., the metal-free PDMC), all of which were prepared at 800° C., an unexpected result was observed. In lieu of improvement in its electrocatalytic activity that is typical for carbon-based materials after doping with metals, the ORR signals of the metal-doped PDMC samples rather shifted to lower potential, indicating an increase in their reactions' overpotential with respect to that of metal-free PDMC (FIG. 3E). The higher catalytic activity exhibited by the metal-free PDMC with respect to the metal-containing counterparts can further be seen in FIG. 3D, by comparing its $J_k$, i.e., kinetic current density determined from RDE data. The results demonstrate the exceptionally higher current density generated in the reaction catalyzed by the metal-free PDMC compared with those generated by PDMCs containing Co, Fe, or Co/Fe.

This finding is different from the results reported for bulk carbons derived from PANI (Wu et al. (Science (2011) 332:443-447). The electrocatalytic performance of the instant PDMCs containing metals toward ORR was found to be comparable to those of the materials reported by Wu et al. However, in the case of Wu et al., higher electrocatalytic activity of the bulk carbons derived from PANI was obtained only when the materials had cobalt or iron in them. Here, surprisingly, the strongest electrocatalytic activity was actually obtained when the mesoporous carbon-based material had no metals in it, as seen by its superior catalytic activity compared with its metal-containing counterparts.

Figure 4:
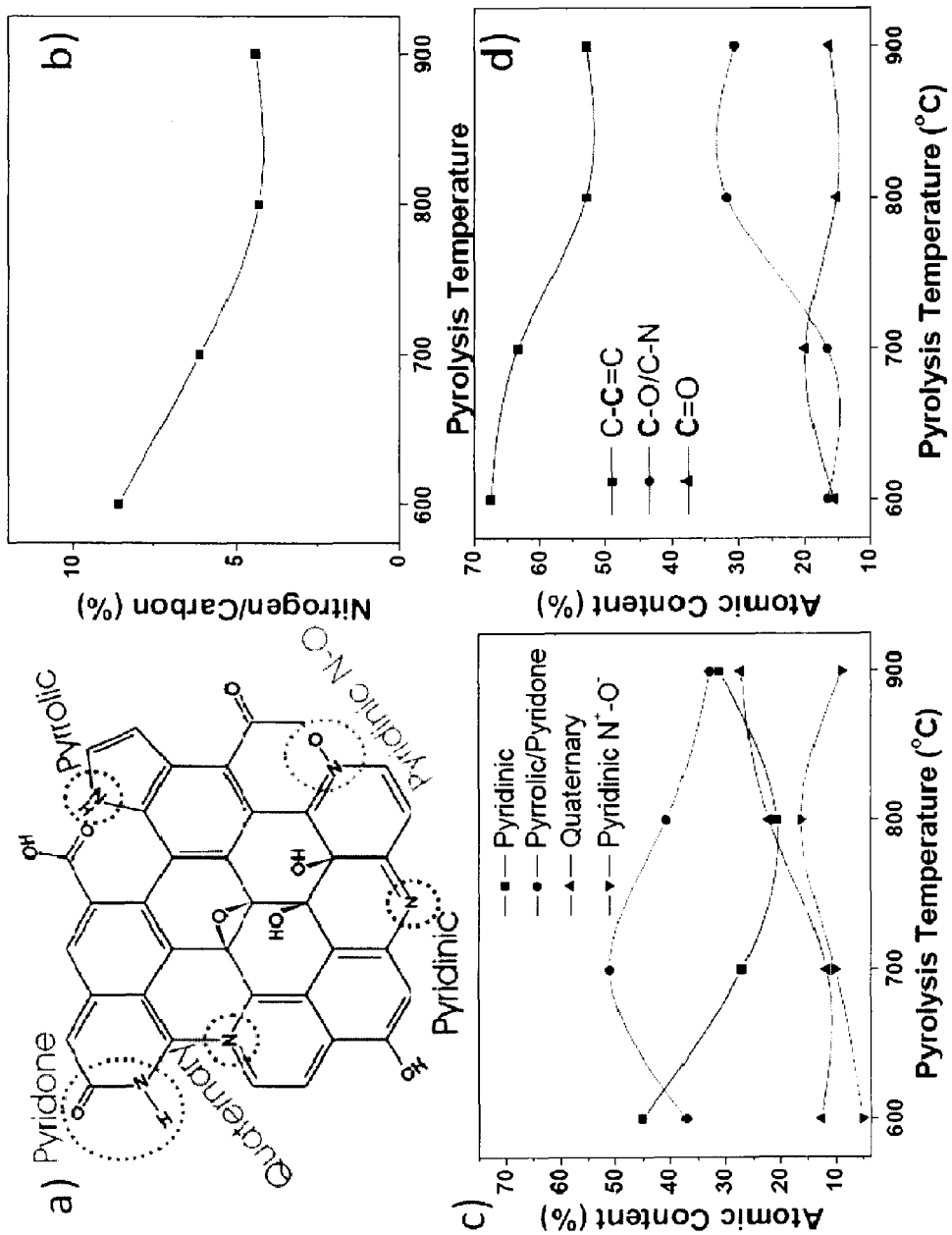

Thus, to get some insights into the interplay between the surface compositions and the electrocatalytic activities of the materials, chemical composition of the materials were probed and extensive chemical surface analysis of the electrocatalysts using XPS was performed (FIGS. 4 and 5). The experiment indicated the presence of the nitrogen species depicted in FIG. 4A within the N-doped PDMCs. The N:C ratio versus pyrolysis temperature plot of the samples (FIG. 4B) shows a significant decrease in N:C ratio when the pyrolysis temperature was increased in the range from 600 to 800° C. However, the N/C ratio at 800 and 900° C. remained virtually unchanged, i.e., 4.30 and 4.39% respectively.

The percentage of the nitrogen species determined from the high resolution XPS N1s spectra of samples treated at different pyrolysis temperatures is presented in the FIG. 4C. Although, quaternary and pyridinic species are the most stable phase at high temperature (>600° C.) in the N-doped carbon (Matter et al. (2006) J. Catalysis, 239:83), the pyrrolic/pyridone species appear to be the prominent N species in the PDMC samples obtained at 700 and 800° C. As the pyrrolic and pyridone nitrogens have very close N is XPS peaks, they are often considered indistinguishable (Pels et al. (1995) Carbon, 33:1641). The presence of pyrrolic nitrogen in PDMC indicates the possible formation of porphyrin-like structures, which has been identified as a possible active site for ORR reaction (Wu et al., (2008) ECS Trans., 16:159). In addition, pyridone species present a very interesting tautomerism between pyridone and hydroxypyridine. Interestingly, pyridone molecules are able to stabilize singlet dioxygen by the formation of a stable adducts. Thus, without being bound by theory, the adduct formation among dioxygen species, formed in the ORR process, and pyridone sites on the PDMC surface can justify the underlying reason behind the reduction of the ORR overpotential. Consequently, the simultaneous doping of N and O to the graphite structure can cause higher impact on ORR. The formation of stable adducts between pyridone and molecular oxygen has analogous oxygen chemisorption geometry verified in the adsorption of molecular oxygen to Pt surface (Balbuena et al. (2003) J. Phys. Chem. B, 107:13671).

This hypothesis of synergic effect between N and O groups postulated here can also be supported by the analysis of high resolution C 1S XPS spectra for different pyrolysis temperature (FIG. 4D). It is observed that the presence of carbon not directly linked to N and O decrease when the pyrolysis temperature increases. It is important to note that the N content in the sample decreases with the increase of the temperature to a minimum around 4%, as previously discussed. Therefore, the results indicated that the content of oxygen species directly bounded to the carbon framework greatly increase along with the pyrolysis temperature. This evidence can be explained by understanding the origin of the oxygen atoms. The carbon precursor, PANI, is composed by C, N and H only. Accordingly, the oxygen atoms in PDMC could come only from the silica template, which is in direct contact with the carbon phase. At high temperatures, condensation of silica take places and oxygen species are released. Consequently, oxygen species from the silica chemically adsorb on PDMC surface.

In conclusion, the synthesis of N- and O-doped mesoporous carbons by carbonization of PANI/SBA-15 mesoporous silica composite material that was obtained by polymerization of PANI in situ within the pores of SBA-15 was reported. The resulting materials were found to be highly electrocatalytically active toward ORR. Without being bound by theory, the oxygen implantation from the silica template onto the N-doped mesoporous carbon during the pyrolysis process may be responsible for the observed high electrocatalytic activity of the resulting metal-free mesoporous carbon material, especially when compared with other related materials, also obtained from bulk PANI, but did not possess oxygen dopants.

Example 2

The structures and composition of the material of the instant invention was further characterized by various methods.

Materials and Methods

PANI/SBA-15 was synthesized as described above. Briefly, as-synthesized SBA-15 was prepared (Xie et al. (2008) J. Phys. Chem. C, 112:9996) and externally modified with methyl groups using hexamethyldisilazane (HMDS). The internal walls of SBA-15 were modified using N-(2-aminoethyl)-3-aminopropyltrimethoxysilane, generating diamine groups on the surfaces of its mesopores (SBA-15/Diamine). The diamine groups in the inner walls were protonated in dilute HCl solution and the resulting ammonium ions were used for chelation of persulfate ions. When the resulting SBA-15/Diamine-Persulfate material was dispersed in aniline solution under acidic condition, polymerization of PANI occurred. The PANI/SBA-15 was recovered by centrifugation and washed with 1:1 ratio of acetone:ethanol solution. Co(II)-doped PANI/SBA-15 was prepared by treating the PANI/SBA-15 with aqueous $Co^{2+}$ solution and washing the precipitate with ethanol to remove the residual Co2+ ions that are not chelated. The resulting PANI/SBA-15 and Co-doped PANI/SBA-15 materials were well characterized and then their electrochemical and electrocatalytic properties in L-ascorbic acid oxidation were performed.

FTIR spectra of all the materials were recorded using a Thermo Nicolet Avatar 360 FTIR spectrometer. Solid state UV-Vis measurements were carried out with a PerkinElmer Lambda 850 spectrometer. Samples for the UV-Vis measurement were prepared by sandwiching the powdered materials in between two quartz slides. $N_2$ gas sorption measurements of the samples were performed using a Micromeritics Tristar-3000 instrument. From the adsorption-desorption data, the Brunauer-Emmett-Teller (BET) surface areas and Barrett-Joyner-Halenda (BJH) pore size distributions of the materials were obtained. Transmission electron microscope (TEM) images were obtained with a Topcon 002B TEM microscope operating at 200 KeV. Electrochemical analyses of the samples and electrocatalysis using the materials as electrocatalysts were conducted using a Versastat-3 from PAR (Princeton Applied Research) instrument. A three-electrode configuration consisting of a saturated calomel electrode as the reference electrode, a platinum wire (diameter: 0.1 mm) as the counter electrode and a carbon paste electrode (CPE) as the working electrode was employed. To prepare the CPE electrode, first equal masses of paraffin and graphite (1 g each) were mixed, and then dispersed in 50 mL hexane. The solution was then left to dry at room temperature until it became somewhat viscous. The resulting viscous paste was packed into a polyethylene tube (transversal area 0.175 cm$^2$). The electric contact was created by inserting part of a copper wire into the graphite/paraffin paste inside the polyethylene tube. The surface of the electrode was then polished using a sheet of paper. Finally, PANI/SBA-15 or Co(II)-loaded PANI/SBA-15 (0.5 mg) was spread over the surface of the paste. The powdered catalyst was uniformly dispersed over a smooth surface and the CPE is manually and repeatedly pressed against it to let the powder catalyst stick to the CPE electrode. The residual hexane from the paste was removed by keeping the electrodes in a vacuum atmosphere for overnight.

Results

At the outset, the amount of diamine groups inside SBA-15/Diamine was determined by elemental analysis, which showed 4.40 wt. % nitrogen or 1.61 mmol diamine/g sample. The amount of persulfate ($S_2O_8^{2-}$) ions retained within SBA-15/Diammonium-Persulfate material was determined by elemental analysis of sulfur, which gave 4.23 wt. % or 0.66 mmol $S_2O_8^{2-}$/g of sample.

The undoped and HCl-doped forms of PANI/SBA-15 were characterized using UV-Vis absorption spectroscopy. FIG. 6 shows the UV-Vis absorption spectra of undoped and HCl-doped forms of the PANI/SBA-15 synthesized with the instant method. The well-known absorption bands and absorption shifts corresponding to undoped and H+-doped PANI in the PANI/SBA-15 composite materials are confirmed by UV-Vis absorption spectroscopy (FIG. 6). Both spectra show three absorption bands. In the undoped form the three bands are centered at ~218, ~348 and ~625 nm, and in the HCl-doped PANI the bands appear at ~218, ~404 and ≡858 nm. The first band is due to π-π* transition of the benzoid rings whereas the other two bands are due to absorption/exciton formation by the quinoid rings (Xia et al. (1994) Macromolecules 27:7212). The observed spectra and peak positions in both the doped and undoped forms are in complete agreement with the well-known characteristic signals of PANI prepared by other conventional methods (Chen et al. (1995) J. Am. Chem. Soc., 117:10055). This indicates that PANI with high molecular mass is indeed formed inside the channel pores of SBA-15. Furthermore, the undoped and HCl-doped forms of the PANI/SBA-15 were shown to reversibly transform several times by stirring the material in ammonia and HCl solution (Bossi et al. (2000) Anal. Chem., 72:4296).

The PANI/SBA-15 sample and its parent material were further analyzed by thermogravimetric analysis (TGA). The TGA curves of SBA-15/Diamine and PANI/SBA-15 are presented in FIG. 7. In both TGA curves, an initial weight loss below 100° C. due to physisorbed solvent molecules is seen. The degradation of the organic species from the materials started at ~223° C. for SBA-15/Diamine and at a lower temperature of ~182° C. for PANI/SBA-15.

The wt % PANI in the PANI/SBA-15 has been carefully determined by comparing the thermogravimetric (TG) traces of PANI/SBA-15 and its parent material (SBA-15/Diamine), FIG. 7, after normalizing the two curves at 120° C., i.e., the temperature at which decomposition of due to physisorbed solvent/water molecules was complete. The calculation showed that PANI-SBA-15 has ~4.7 wt % more organic group in it than its parent sample, i.e., SBA-15/Diamine. Thus, the wt % of PANI in PANI/SBA-15 to be ~4.7% since the difference between the two materials is the presence of PANI in PANI/SBA-15.

The materials were further analyzed by $N_2$ gas adsorption (FIG. 8). The surface areas of SBA-15, SBA-15/Diamine and PANI/SBA-15 were found to be 478, 212 and 224 m$^2$/g, respectively (Table 3). The data shows a drastic change in the surface area of the SBA-15 after its surface is modified by diamine groups. This change is expected considering the fact that the pores of the SBA-15 material are filled with 1.6 mmol of relatively large N-(2-aminoethyl)-3-aminopropyl ligands per gram sample. The decrease in surface area of PANI/SBA-15 compared to SBA-15/Diamine is, however, relatively small. This smaller change in the surface area here indicates that the PANI is well-dispersed over the inner wall surface of SBA-15, barely blocking the channel pores. This conclusion was corroborated by pore size distribution analyses, which showed the presence of uniform pores, except for some reduction in their pore sizes and tail in the desorption branch of the isotherm due to the formation of PANI in the pores of SBA-15.

TABLE 3

BET surface area, BJH pore size and pore volumes.

| Sample | BET Surface Area (m$^2$/g) | Pore size (nm)$^a$ | Pore Volume (cm$^3$/g)$^a$ |
|---|---|---|---|
| SBA-15 | 478 | 7.4 | 0.69 |
| SBA-15/Diamine | 224 | 5.3 | 0.41 |
| PANI/SBA-15 | 212 | 3.8 | 0.29 |

$^a$Obtained from the desorption branch of $N_2$ adsorption/desorption measurements.

By comparing the pore volumes of the three materials (FIG. 9 and Table 3), the formation of PANI on the inner surface of the channel pores of SBA-15 without filling them, was further corroborated. The pore volume of SBA-15 was clearly decreased after its functionalization with diamine groups, and after polymerization of PANI inside the pores. The significant reduction in pore volume after the latter step clearly suggests the presence of polymers in the internal space of the channel pores. This result was further corroborated by the significant reduction in the average BJH pore width of the material from ~7.4 to ~3.8 nm. On the other hand, however, the observed insignificant change in surface area of the material after polymerization indicates the formation of PANI on the channel wall surface of SBA-15 and the presence of pores with no significant pore clogging, if any.

FIG. 10 shows the wide angle powder X-ray diffractograms (PXRD) of the SBA-15 modified with diamine groups and of the composite are presented. In both cases, only a broad signal around 22° corresponding to an amorphous phase of silica framework is observed. Thus, PANI in the PANI/SBA-15 composite is amorphous.

Figure 11:
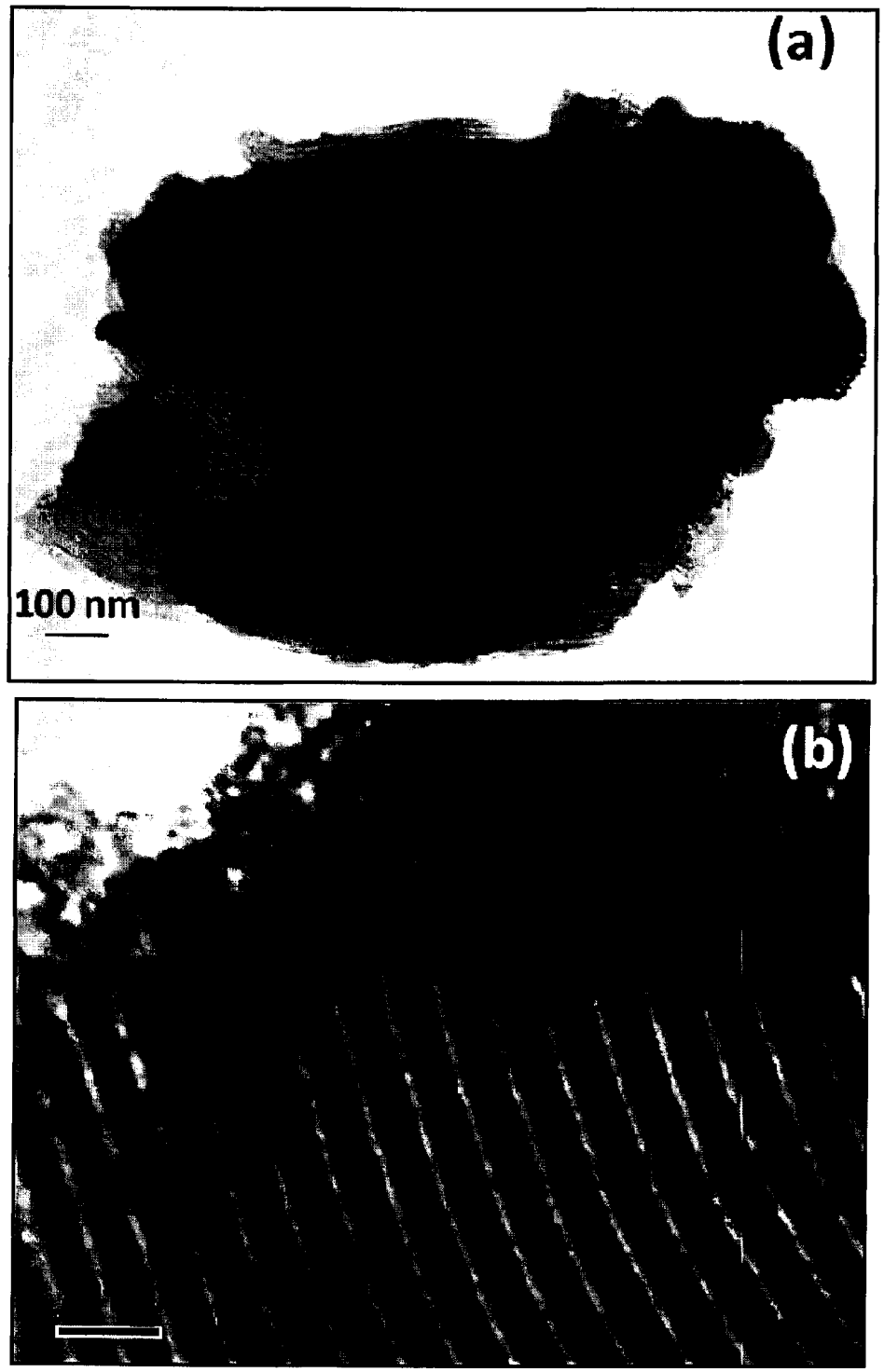

TEM images of PANI/SBA-15 also show that the material has well-defined channel-like pores with no visible polymer aggregates, both inside its channel pores as well as outside the surface of the SBA-15 particles (FIG. 11). This result is also consistent with the result obtained from $N_2$ sorption measurement above, i.e., the PANI was formed mainly on the inner channel walls of the SBA-15 material, without filling its channel pores.

Cyclic voltammetric response of the CPE electrode modified with Pt/C in the presence of L-ascorbic acid is presented in FIG. 12. The signal attributed to the oxidation of the ascorbic acid is verified as a broad signal centered at 0.16V.

The electrochemical properties and electrocatalytic activities of PANI/SBA-15 and Co(II)-doped PANI/SBA-15 in oxidation of L-ascorbic acid were also characterized. Successful catalytic oxidation of L-ascorbic acid is appealing because it has recently been shown that L-ascorbic acid can be used as fuel in direct fuel cells operating at room temperature (Fujiwara et al. (2007) J. Power Sources 167: 32). The electrochemical characterization of PANI/SBA-15 and Co(II)-loaded PANI/SBA-15 was performed with cyclic voltammetry on a sample prepared by placing 0.5 mg of the composite materials on the surface of a carbon paste electrode (CPE). FIG. 13A shows the cyclic voltammograms (CV) of a bare CPE and a CPE coated with PANI/SBA-15. The CV of PANI/SBA-15 shows two main redox processes (IA/IC and IIA/IIC), with their anodic peaks centered at −0.325 and 0.256 V, respectively. These two redox processes are due to the typical inter-conversion reactions of PANI that take place upon varying the potential. While the IA/IC redox process corresponds to the leucoemaldine/emeraldine transition, the IIA/IIC redox process corresponds to emeraldine/pernigraniline transition (D'Aprano et al. (1992) Macromolecules 25:2145; Bazito et al. (2008) Phys. Chem. Chem. Phys., 10:1457; FIG. 13I). Moreover, the appearance of strong characteristic signals of PANI in the PANI/SBA-15 indicates that the PANI hosted within the pores of SBA-15 is highly electroactive.

Transition metals (such as Ni, Zn, Fe, and La) as well as rare-earth metals (such as Eu, Sm, and Nd) may interact with PANI and form pseudo-protonated structures having improved conductivity (Smertenko et al. (2004) Synt. Met., 146:187). As such, Co(II)-doped PANI/SBA-15 material was prepared and its electrochemical and electrocatalytic properties in anodic oxidation of L-ascorbic acid were investigated. As explained herein, the material was synthesized by letting the nitrogen atoms of PANI as well as the residual diamine groups within the channels pores of PANI/SBA-15 chelate to Co(II) ions from excess aqueous Co(II) solution. This gave 2.52 mmol Co(II) in a gram of PANI/SBA-15. However, in a control experiment, where excess aqueous Co(II) solution was stirred with SBA-15/Diamine, only 0.61 mmol Co(II) in a gram of SBA-15/Diamine was obtained. Thus, the presence of PANI in the mesoporous SBA-15 material clearly led to the chemisorption of more than four-fold Co(II) ions in material. This is most likely due to the presence of relatively larger density of N-atoms in PANI, which form favorable interactions with Co(II). This result further indicates that the Co(II) ions are predominantly around PANI, and thus potentially able to form pseudo-protonated structures.

Cyclic voltammetry of the resulting Co(II)-doped PANI/SBA-15 material is presented in FIG. 13B. In the voltammogram, three redox processes are clearly observable. The peaks at −0.302 and 0.245 V are attributed to the transition in oxidation states of PANI (cf., the corresponding values for PANI/SBA-15 are −0.325 and 0.256 V, respectively). Thus, these results indicate that the doping of PANI/SBA-15 with Co(II) makes the redox potentials for PANI to shift to lower values. In other words, doping of PANI/SBA-15 with Co(II) makes the PANI to undergo oxidation/reduction processes more easily. The third redox signal, whose anodic process is shown at ~0.0 V, is attributed to the inter-conversion of Co2+/Co3+. It is worth noting that the inter-conversion of Co2+/Co3+ in the Co(II)-doped PANI/SBA-15 material takes place while PANI is in its highest conductive form, i.e., the emeraldine salt.

In FIGS. 13C and 13D, the cyclic voltammograms (CV) of PANI/SBA-15 in the presence of diluted solution of L-ascorbic acid at different sweep rates are shown. The cyclic voltammograms are composed of three oxidation peaks and a very broad reduction signal. The asymmetry between the anodic and cathodic currents suggests that the two processes are not reversible. More importantly, the observed stronger anodic current compared to cathodic current in the CV indicates the occurrence of net oxidation in the redox cycle, or the oxidation of a substance (i.e., L-ascorbic acid in this case). Furthermore, when the concentration of L-ascorbic acid was increased, the anodic current became much stronger in the positive sweep direction as shown in FIG. 13D.

By comparing the cyclic voltammograms in FIGS. 13C and 13D, the central oxidation peak is confirmed to be a signal associated with the oxidation of L-ascorbic acid. Furthermore, it can be seen that the potential at which the oxidation of L-ascorbic acid occurs shifts from low to high as the concentration of L-ascorbic acid increases. For instance, the oxidation of L-ascorbic acid in the presence of PANI/SBA-15 occurs at 0.134 V in 1 mM L-ascorbic acid solution, but at 0.209 V in 10 mM L-ascorbic acid solution.

The result in FIG. 13D further shows that PANI/SBA-15 exhibits a strong catalytic activity in the oxidation of L-ascorbic acid, with very low overpotential and strong current density. Interestingly, the potential required for oxidation of L-ascorbic acid and the current density obtained when using PANI/SBA-15 as an electrocatalyst are actually found to be very comparable to those of conventional Pt/C electrocatalytsts. For instance, the potential required for oxidation of 10 mM L-ascorbic acid solution with Pt/C was found to be 0.160 V at the same sweep rate of 100 mV s−1 (cf., it is 0.209 V for PANI/SBA-15).

The electrocatalytic property of Co(II)-doped PANI/SBA-15 in oxidation of L-ascorbic acid was also investigated in the same way as above, and the results are presented in FIGS. 13E and 13F. The shapes of the voltammograms for Co(II)-doped PANI/SBA-15 (FIG. 13E) appear to be very similar to those obtained for PANI/SBA-15 (FIG. 13C), except for the slightly narrow central anodic peak in the former. Furthermore, a sharp cathodic peak at 0.050 V that is superposed to the broad signal in the negative sweep direction is seen in the case of Co(II)-doped PANI/SBA-15, demonstrating the reversibility of the Co2+/Co3+ transition in this sample. This peak is not observed in the metal-free PANI/SBA-15, as expected.

Since the position of the anodic oxidation signal of L-ascorbic acid obtained for the Co(II)-doped PANI/SBA-15 material is virtually the same as the one obtained for the metal-free PANI/SBA-15, the results clearly indicate that there was no further improvement in the electrocatalytic activity of the material as a result of the presence of Co(II) ions in it. Nonetheless, the electrochemical experiment reveals that the Co(II) ions immobilized within the channels pores of the PANI/SBA-15 material efficiently undergoes redox processes. Therefore, despite the Co(II)-doped material does not exhibit enhanced electrocatalytic activity toward oxidation of L-ascorbic acid, the results show that the PANI/SBA-15 material is capable of holding high density of metal ions that are electrochemiaclly accessible in it. Furthermore, the presence of Co(II) makes PANI's redox potential to shift to lower values or PANI to undergo oxidation/reduction process more easily. Despite no improved electrocatalytic activity is observed as a result of doping of PANI/SBA-15 with Co(II), these results themselves are interesting for the following reasons. First, the reported synthetic method is shown to produce nanocomposite materials with easily accessible electroactive metal complexes within nanoporous structures. Second, the structure of Co(II) species in the Co(II)-doped PANI/SBA-15 material mimics different metal ions stabilized by proteins within the nanosize active sites of many enzymes (Wiester et al. (2011) Angew. Chem. Int. Ed., 50:114; Hosseini et al. (1989) J. Am. Chem. Soc., 111:6330). Finally, the experimental demonstration of accessing the redox properties of the metal ions within the pores of the Co(II)-doped PANI/SBA-15 material via PANI is akin to the synergistic activities exhibited by two or more groups in many bifunctional enzymes during various physiologically relevant processes in the body.

In order to further confirm the involvement of the PANI/SBA-15 system as an electrocatalyst, a control experiment involving bare CPE electrode as an electrocatalyst in the oxidation of L-ascorbic acid was performed (FIG. 13G). However, the CV does not show the strong signal associated with oxidation of L-ascorbic acid at ~0.2 V. The effectiveness of the PANI/SBA-15 material as an electrocatalyst is further evaluated by comparing its electrocatalytic activity with that of commercially available Pt/C electrocatalyst. FIG. 7H shows the chronoamperometric curves for the oxidation of L-ascorbic acid at constant potential of 0.2 V using PANI/SBA-15 and Pt/C as electrocatalysts. The results indicate that the current densities remain reasonably stable for several hours for both materials. The results in FIG. 13H further reveal that the average current density obtained from PANI/SBA-15 is about 82% as much as that of Pt/C when both materials are used as electrocatalysts in L-ascorbic acid oxidation under similar conditions.

In conclusion, SBA-15 mesoporous silica, having diamine groups in its internal channel pores, was successfully used for controlled polymerization of PANI nanostructures within the channel-pores. The synthesis produced a high surface area PANI/SBA-15 nanocomposite material composed of approximately 4.7 wt % PANI. The resulting PANI/SBA-15 material showed high electroactivity. In addition, the PANI/SBA-15 material was used as a high surface area material to chemisorb redox active Co(II) ions, presumably through the interaction between PANI/diamine groups and the Co(II) ions. By applying cyclic sweep potential over both PANI/SBA-15 and Co(II)-doped PANI/SBA-15 with cyclic voltammetry, reversible redox properties associated with PANI (as well as reversible redox signals corresponding to Co2+/Co3+ transition) were observed. The redox inter-conversion of Co2+/Co3+ occurred while PANI was in its most conducting form, i.e., emeraldine salt. Accessing the redox activity of the metal ions (Co3+) entrapped within the nanopores of the PANI/SBA-15 via the conducting PANI would be advantageous for the utilization of these materials as electrocatalysts in fuel cells. Indeed, both the metal-free (PANI/SBA-15) as well as Co(II)-loaded PANI/SBA-15 nanocomposite materials showed high activity in oxidation of L-ascorbic acid at an extremely low overpotential, yielding high current density. Furthermore, the electrocatalytic activity of PANI/SBA-15 toward oxidation of L-ascorbic acid was found to be very comparable to that obtained from a conventional and more expensive Pt/C electrocatalyst. Thus, the SBA-15/PANI can serve as an inexpensive substitute material and efficient electrocatalyst in fuel cells and other catalytic reactions, where expensive Pt-based materials have found wide ranges of applications, including fuel cells. Furthermore, because of the presence of its robust inorganic support material (SBA-15), the PANI/SBA15 system would have greater stability to high temperatures and different solutions. Moreover, because the SBA-15 support material contains residual surface silanol groups, the PANI/SBA15 can easily be modified with other functional groups (Sharma et al. (2008) J. Am. Chem. Soc., 130:218), generating even more versatile electroacatalytic systems.

Example 3

Experimental Procedures
Reagents and Chemicals
Poly(ethyleneglycol)-block-poly(propyleneglycol)-block-poly(ethyleneglycol) ($(PEG)_{20}(PPG)_{70}(PEG)_{20}$ or Pluronic® R123, average molecular mass ca. 5800) was obtained from BASF. Tetraethyl orthosilicate (TEOS), hexamethyldisilazane (HMDS), acetone, toluene, sodium persulfate, pyrrole, hydrazine, phosphate buffer saline (PBS, 1×, pH=7.4) and Pt/C (1 wt. % Pt) were purchased from Sigma-Aldrich. Hydrochloric acid (HCl) solution and absolute ethanol (99.99%) were obtained from Fisher Scientific. N-(2-aminoethyl)-3-aminopropyltrimethoxysilane was acquired from Gelest, Inc. All the reagents were used without further purification.
Synthesis of SBA-15/Diamine.
To synthesize, SBA-15/diamine, first mesostructured SBA-15 was prepared according to a reported procedure (Silva et al. (2011) J. Phys. Chem. C, 115:22810-22817). In a typical synthesis, 4.0 g Pluronic® 123 was dissolved in 20 mL concentrated HCl and 130 mL of distilled water. After adjusting the temperature of the solution to 45° C., 8.5 g of TEOS was added in it. The solution was vigorously stirred for 20 h, and then aged in oven at 80° C. for another 36 hours. The as-synthesized mesostructured silica material was recovered by filtration, washed with copious amount of distilled water, and then dried under ambient conditions resulting in a white colored powdered product (as-synthesized mesostructured silica).

Before removing the Pluronics templates from the as-synthesized mesostructured silica, 4 g of the material was dispersed in 5 mL HMDS and 60 mL anhydrous toluene solution for 18 hours at room temperature. This allowed the surfaces of the as-synthesized mesostructured silica nanoparticles to be modified with —$SiMe_3$ (TMS) groups. The resulting TMS-capped mesostructured silica (0.5 g) was then stirred in 100 mL solution of diethyl ether:ethanol (1:1) at room temperature for 5 h to remove the templates. After filtration and air drying, the recovered TMS-capped SBA-15 mesoporous silica (denoted as Me-SBA-15) was functionalized with organodiamine groups by stirring 0.2 g of it in a solution of 2 mL N-(2-aminoethyl)-3-aminopropyltrimethoxysilane in 100 mL anhydrous toluene at 80° C. for 18 hours. The resulting diamine-grafted SBA-15 material was washed with ethanol and then dried under ambient conditions, yielding a diamine-functionalized SBA mesoporous silica, named SBA-15/diamine.

Synthesis of PPY/SBA- 15

For synthesis of PPY/SBA-15, first 100 mg of SBA-15/diamine was stirred in 10 mL HCl solution (1M) containing 800 mg of sodium persulfate for 2 hours at room temperature to anchor persulfate ions on the channel pores of diamine-functionalized SBA-15. The resulting material was filtered and washed with distilled water to remove the excess persulfate ions. The sample was then dispersed in 10 mL distilled water in an ice bath (ca. 0-5° C.), after which 150 μL pyrrole (2.16 mmol) was added drop-wise into the dispersion under vigorous stirring. The mixture was gradually turned black over the first 5 min. The dispersion was kept stirring for 5 hours at ca. 0-5° C. (Zhang et al. (2004) Chem. Commun 1852-1853). The solution was filtered, and the black solid product was recovered and washed with copious amount of acetone and ethanol to remove any free pyrrole and PPY on it. The solid product was further washed with 10 mL of ammonia solution (1M), upon addition of which the color changed immediately to green (i.e., the characteristic color of an "undoped" or neutral PPY) (Mortimer et al. (2006) Displays 27:2-18). The solid material was washed with water and dried under ambient conditions, resulting in PPY/SBA-15.

Synthesis of PPY-Derived N-Doped Mesoporous Carbons (PPY-NMPCs)

The PPY/SBA-15 was pyrolyzed at different temperature in order to carbonize the PPY hosted inside the SBA-15. This was carried out in a temperature-programmable tube furnace at temperatures of 600, 700, 800, 900, or 1000° C. under argon, flowing at a rate of ~30 mL/min. In each case, the temperature was first raised to 200° C. at a ramp of 1° C./min, held at this temperature for 2 hours. The temperature of the furnace was then increased to 300° C. (at a ramp of 1° C./min) and kept at this temperature for another 2 hours. Finally, the temperature was increased to the final, desired pyrolysis temperature at a ramp of 10° C./min, and then kept at that temperature for an additional 2 hours, producing different mesoporous carbon/SBA-15 composite materials.

To remove the mesoporous SBA-15 framework and thereby leave behind a mesoporous carbon, the as-obtained mesoporous carbon/SBA-15 composite materials were collected from the furnace and let to cool down to room temperature. The mesoporous carbon/SBA-15 composite material was the stirred with 1M NaOH solution (10 mL) at 100° C. for 4 hours to dissolve the silica framework. The dispersion was centrifuged, and the resulting black solid product was washed with distilled water and dried. This finally led to N-doped mesoporous carbons that were labelled as PPY-NMPC-T, where T indicates the temperature at which the final pyrolysis was performed. For instance, PPY-NMPC-900 represents the PPY-derived N-doped mesoporous carbon synthesized at 900° C. pyrolysis temperature.

Synthesis of PPY-Derived N-Doped Carbon Black (PPY-NCB) and Polyaniline-Derived Mesoporous Carbon (PANI-NMPC-900) (Control Samples).

For comparison purposes, N-doped carbon black and PANI-derived mesoporous carbons were synthesized. The former was obtained by directly carbonizing bulk polypyrrole, which was synthesized without using mesoporous silica as a hard template for it, but under otherwise identical synthetic conditions. Briefly, 800 mg sodium persulfate was dissolved in 10 mL distilled water in an ice bath. Into this solution was added drop-wise 150 μL pyrrole (2.16 mmol) under vigorous stirring. The solution was gradually turned black within the first 5 minutes. It was kept stirring in the ice bath for additional 5 hours. The resulting black product was collected by filtration and washed with copious amount of acetone and ethanol. It was then washed with 10 mL of ammonia solution (1M), during which color changes to green; the resulting materials was washed with water and then dried under ambient condition, resulting in bulk polypyrrole (PPY). The PPY was then pyrolyzed at 900° C. in a temperature-programmable tube furnace in argon atmosphere under similar thermal treatment conditions as described above. This finally resulted in PPY-derived N-doped carbon black, which was denoted as PPY-NCB-900. The PANI-NMPC-900 was synthesized by following a reported procedure (Silva et al. (2013) J. Am. Chem. Soc. 135:7823-7826).

Preparation of Working Electrodes.

The electrochemical and eletrocatalytic properties of all the mesoporous carbons were evaluated with a Versastat3 potentiostat (Princeton Applied Research, PAR) using a three-electrode configuration. The cell consisted of a saturated calomel electrode (SCE) as the reference electrode, a platinum wire (diameter: 0.1 mm) as the counter electrode and a glassy carbon disk with catalyst as the working electrode. To prepare the working electrode, 2 mg of the sample was first dispersed in 200 μL of 2-propanol under sonication. Then, 2 μL of the resulting suspension was pipetted and drop-casted onto the surface of a freshly polished glassy carbon disc electrode (GCE). After letting the catalyst-coated electrode surface to dry under atmospheric conditions, 2 μL Nafion (10%) solution was drop-casted on the top of the electrode and allowed to dry.

Cyclic Voltammetry.

Cyclic voltammetry (CV) analyses of the materials or electrocatalysts were conducted in a 0.1M phosphate buffered saline (PBS) at pH=7.4. In the CV measurements, the potential was scanned from −0.6 V to 0.6 V vs. SCE at 10 mV/s scan rate, and the concentration of hydrazine was varied in a range between 10 mM to 100 mM. All the electrochemical measurements were performed at room temperature and ambient pressure.

Rotating Disc Electrode (RDE).

The polarization curve in the presence of PPY-NMPC-900 was analyzed using a rotate disc electrode (RDE) (Pine Research Instrumentation) connected to a Pine Bi-potentiostat (Pine Research Instrumentation) that is equipped with a rotator (Pine Research Instrumentation). For the experiment, a three-electrode configuration consisting of a saturated calomel electrode as the reference electrode, a carbon rod as the counter electrode and powder sample supported on glassy carbon as the working electrode was employed. The working electrode was scanned at a rate of 10 mV/s and at 900 rpm in the RDE based experiments.

Instrumentations and Characterizations.

The X-ray diffraction (XRD) patterns for samples at low (0.74 to 10° in 2θ) and wide angle (from 10 to 80° in 2θ) were recorded on Rigaku D/Max 2550 X-ray diffractometer operating at a wavelength of λ=0.15405 nm (Cu—Kα radiation). The pore properties of the materials were investigated through nitrogen adsorption/desorption measurements at the liquid-nitrogen temperature (−196° C.) using a Micromeritics TriStar-3000 (Micromeritics Instrument Corp., USA). Before each measurement, the sample was degassed for 12 hours at 50° C. under nitrogen gas. The Brunauer-Emmett-Teller (BET) surface areas and the Barrett-Joyner-Halenda (BJH) pore size distributions of the samples were determined from the adsorption/desorption data. Thermogravimetric analysis (TGA) was performed with a TGA 7 (Perkin Elmer, USA) thermogravimetric analyzer under nitrogen gas that was flowing at a flow rate of 10 mL/min and at a heating rate of 10° C./min. FTIR spectra, from 4000 to 400 cm-1 wavenumbers, were acquired with a Thermo Nicolet Avatar 360 FTIR spectrometer by placing the samples on pre-dried KBr disc. The FT-Raman spectra were obtained using a Renishaw Raman spectrometer (Model 1000) operating with a 20 mW air-cooled argon ion laser ($\lambda$=514.5 nm) as its excitation lights source. The laser power at the sample position was typically 400 µW with an average spot-size of 1 µm in diameter. The element composition was probed through X-ray photoelectron (XPS) using an X-ray photoelectron spectrometer (ES-CALAB 250) equipped with an Al K$\alpha$ as its X-ray source (h$\nu$=1486.6 eV). The spectra were collected with an energy resolution of 1 eV for the survey scans and 0.1 eV for high resolution scans of the individual peaks. The structures and morphology of the as-synthesized mesoporous silica and mesoporous carbons were acquired with a scanning transmission electron microscope (STEM) (Magellen 400L) and a transmission electron microscope (TEM) (Topcon 002B).

Results

Herein, polypyrrole (PPY)-derived N-doped mesoporous carbons (PPY-NMPCs) are shown herein to serve as efficient metal-free electrocatalyst (e.g., for the hydrazine oxidation reaction (HOR)). The PPY-NMPCs are synthesized via polymerization of pyrrole on the channel walls of SBA-15 mesoporous silica (resulting in PY/SBA-15), followed by carbonization of the PPY in PPY/SBA-15 and subsequent removal of the mesoporous silica framework. It is worth noting that the pyrrole is polymerized while it is in liquid state and in absence of any metal (cf. the Fe-activated chemical vapor deposition/polymerization synthetic route employed to make PPY in SBA-15, and then Fe/mesoporous carbons (see Fulvio et al. (2008) J. Phys. Chem. C, 112: 13126-13133). The liquid phase polymerization may have, in turn, been responsible for the observed three dimensional structure and interesting electrocatalytic properties of the resulting mesoporous carbons (vide infra). Notably, restricting the polymerization of PPY only inside the channel pores of SBA-15 is important for the successful synthesis of the desired mesoporous carbons. This was achieved by protecting the silanol groups residing on the outer surfaces of as-synthesized mesostructured silica with TMS (—SiMe$_3$) groups before the surfactant templates were removed from as-prepared TMS-modified mesostructured silica. After heat treatment steps at relatively lower temperatures, the PPY/SBA-15 was pyrolyzed at different high temperatures (600, 700, 800, 900, or 1000° C.) to subject the carbon to graphitization; this ultimately resulted in different PPY-NMPCs. In the process, SBA-15 served as hard template aiding PPY to form N-doped mesoporous carbon structure. For comparison, PPY-derived N-doped carbon black (PPY-NCB-900) was synthesized directly by pyrolysis of bulk PPY at 900° C., without SBA-15 template.

The structures of PPY-NMPCs, its parent materials and all the control samples were established by various characterization methods. N$_2$ gas adsorption/desorption measurement revealed that the surface areas of Me-SBA-15, SBA-15/diamine and PPY/SBA-15 are 501, 235 and 218 m$^2$/g, respectively (Table 4). The result indicates that the surface area of the SBA-15 decreases significantly after its channel pores are modified by diamine groups. This change can be expected given the fact that the pores of the SBA-15 material are filled with N-(2-aminoethyl)-3-aminopropyl ligands. The difference in surface area between PPY/SBA-15 and SBA-15/diamine is, however, relatively small, suggesting that the PPY is well-dispersed over the inner surfaces of SBA-15, causing not much blockage of the SBA-15's pores. This conclusion is corroborated by pore size distribution analyses (Table 4). The data show the presence of uniform pores, except for slight reduction in pore size and a tail in the desorption branch of the isotherm indicating the presence of only some pore blockage. The in situ polymerization of PPY on the inner surface of the channel pores of SBA-15 was further confirmed by comparing the pore volumes of these three materials (Table 4). The pore volume of SBA-15 is expectedly decreased after diamine functionalization. There is also significant reduction in pore volume when SBA-15/diamine is converted to PPY/SBA-15, which is clearly in line with the presence of polymers in the pores of SBA-15. This result is also in agreement with the significant reduction in the average pore size of the material from ~7.7 to ~3.8 nm when Me-SBA-15 becomes PPY/SBA-15.

TABLE 4

BET surface area, BJH pore size, and pore volumes of capped SBA-15 mesoporous silica (Me-SBA-15), diamine-functionalized SBA-15 (SBA-15/diamine), and PPY/SBA-15 materials.

| Sample | BET Surface Area (m$^2$/g) | Pore Size (nm) [a] | Pore Volume (cm$^3$/g) [a] |
|---|---|---|---|
| Me-SBA-15 | 502 | 7.7 | 0.85 |
| SBA-15/diamine | 235 | 6.3 | 0.46 |
| PPY/SBA-15 | 218 | 3.8 | 0.31 |

[a] Obtained from the desorption branch of N2 adsorption/desorption isotherms.

The TEM images of PPY/SBA-15 shows that the material has well-defined channel-like pores without any visible polymer aggregates both inside its channel pores as well as on its outer surfaces. This result is also consistent with the results obtained from N$_2$ adsorption/desorption above, which indicates the PPY in the channel pores of PPY/SBA-15 to be well distributed. It is worth mentioning that the wide angle XRD patterns of PPY/SBA-15 and SBA-15/diamine show only a broad signal at 2-theta of ca. 24°, which corresponds to amorphous structure. This reveals that the PPY in PPY/SBA-15 (and the SBA-15 framework) are both amorphous.

The FTIR spectrum for TMS-functionalized SBA-15 shows a band at 2968 cm$^{-1}$, which can be attributed to the C—H stretching modes of the Me groups in it (Dano et al. (2011) J. Phys. Chem. C, 115:11540-11549). A broad N—H bending vibration signal at 1582 cm$^{-1}$ in the FTIR spectrum of SBA-15/diamine can be assigned to the diamine groups grafted in it.

The thermogravimetric analysis (TGA) curves of Me-SBA-15, SBA-15/diamine and PPY/SBA-15 were determined. The TGA traces of SBA-15/diamine and PPY/SBA-15 show a weight loss below 100° C., which can be assigned to the loss of physisorbed water. The TGA traces further show degradation of organic moieties from all the three materials starting at ~225° C., 211° C., and 187° C. for Me-SBA-15, SBA-15/diamine and PPY/SBA-15, respectively. By comparing the weight losses associated with the organic groups in PPY/SBA-15 vis-a-vis its parental materials, the wt. % of PPY in PPY/SBA-15 is calculated to be ~6.3%.

The mesoprous carbons obtained after carbonization and subsequent removal of silica templates were then characterized. Since the material obtained after pyrolysis at 900° C. (PPY-NMPC-900) exhibited superior electrocatalytic activity for HOR, it was chosen for detailed discussion here. Its small angle X-ray diffraction (XRD) pattern shows a sharp peak at 0.65°, indicating that it has ordered mesostructure. In contrast, the control sample PPY-NCB-900 that was synthesized without using SBA-15 as template showed no low angle Bragg reflection or ordered structure. These results confirm the importance of SBA-15 as a hard template in assisting PPY to form mesoporous carbons.

The PPY-NMPC-900 was further investigated by $N_2$ gas adsorption/desorption measurement (FIG. 14A). Its BET surface area and pore volume are found to be 398 $m^2/g$ and 0.16 $cm^3/g$, respectively, confirming its high mesoporosity. Additionally, the BJH mesopore size distribution plot (FIG. 2b) shows that PPY-NMPC-900 has monodisperse pores, with average pore diameter of 4.0 nm.

The TEM images of PPY-NMPC-900 (FIG. 14C) reveal that the material has well-connected mesoporous structure, in some ways similar to and in other ways different from the PPY-derived $Fe_2O_3$/N-doped mesoporous carbons synthesized via vapor deposition of PPY (Fulvio et al. (2008) J. Phys. Chem. C, 112:13126-13133). In addition, the TEM images show the material to have the original SBA-15-like morphology.

The FT-Raman spectra of PPY-NMPC-900 and NCB-900 (FIG. 14D) show two distinct peaks at 1349 $cm^{-1}$ and 1586 $cm^{-1}$, corresponding to the characteristic D and G bands, respectively, of graphitic carbon materials (Dano et al. (2011) J. Phys. Chem. C 115:11540-11549). The D band is commonly associated with structural defects, which is presumably due to the presence of N dopant atoms and/or concomitant absence of some of C atoms in the structure of the mesoporous carbon. The G band, which is due to first-order scattering corresponding to $E_{2g}$ mode of graphitic structures (Yang et al. (2010) Adv. Mater., 22:8408-8411; Qian et al. (2009) Nano Res., 2:706-712), indicates the presence of graphitic structure in PPY-NMPC-900 and NCB-900. The $I_D/I_G$ ratio for PPY-NMPCs is decreased from 1.00 to 0.93 when the pyrolysis temperature used to make them is raised from 600° C. to 1000° C.; this means higher pyrolysis temperature yields higher graphitic content in the material (Shao et al. (2010) J. Mater. Chem., 20:7491-7496). Moreover, the ID/IG of PPY-NMPC-900 (0.97) is found to be higher than that of PPY-NCB-900 (0.90), which means PPY-NMPC-900 contained more defect sites than PPY-NCB-900.

X-ray photoelectron spectroscopy (XPS) was performed to probe the composition and defects of PPY-NMPCs (Qu et al. (2010) ACS Nano 4:1321-1326). As can be seen in FIG. 15A, the XPS survey spectra for the PPY-NMPCs show a narrow peak at ca. 284.5 eV associated with graphitic C is electrons, and a peak at ca. 400 eV due to N is electrons. In addition, a peak at ca. 533 eV associated with an O is electrons is observed. These oxygen species could be due to physisorbed oxygen, moisture or $CO_2$ (Yang et al. (2012) Adv. Funct. Mater., 22:3634-3640), or oxygen dopants from the silica framework during pyrolysis (Silva et al. (2013) J. Am. Chem. Soc., 135:7823-7826). With increasing pyrolysis temperature, the N/C atomic ratio for PPY-NMPCs decreases; e.g., from ca. 8.1% for PPY-NMPC-600 to ca. 2.1% for PPY-NMPC-1000 (FIG. 15B). By acquiring high-resolution of N 1s and C 1s spectra of all the PPY-NMPCs, the chemical state of the nitrogen and carbon moities in the samples were further probed. The N1s peak was deconvoluted into two peaks with binding energies at 398.5 eV and 401 eV, corresponding to pyridinic and graphitic-like N, respectively (Collins et al. (2000) Nanotubes. Science 287: 1801-1804). The pyridinic nitrogens are the ones at the edges of graphitic structure that are bonded to two carbon atoms, donating a lone pair electron to the aromatic π system (Liu et al. (2010) Angew. Chem., 122:2619-2623). Graphitic N atoms, on the other hand, are those incorporated within the graphitic network substituting some of carbon atoms (Kurak et al. (2009) J. Phys. Chem. C, 113:6730-6734). As illustrated in FIG. 15C, the content of graphitic N is generally more than that of pyridinc N in all of the PPY-NMPCs obtained at all pyrolysis temperatures. Moreover, the content of graphite N atoms is found to increase with increasing pyrolysis temperature, especially between 900° C. and 1000° C. However, the pyridinic N has an opposite trend compared with graphite N. This is in agreement with a previous study on N-doped grapene (Biddinger et al. (2010) J. Phys. Chem. C, 114:15306-15314) in which increasing pyrolysis temperature was reported to produce more graphitic N atoms at the expense of the less stable pyridinic N species.

The high resolution C is spectra of PPY-NMPCs further confirmed the presence of C=C (284.8 eV) and C=N (285.8 eV) species and O-attached carbons, such as C=O bond (288 eV) and C—O bond (285.8 eV) (Sheng et al. (2011) ACS Nano 5:4350-4358; Wang et al. (2010) ACS Nano 4:1790-1798). The peaks associated with C=N bond must have originated from substitution of the C atoms of graphitic carbon with N atoms, as reported before (Wei et al. (2009) Nano Lett., 9:1752-1758). The peaks corresponding to C=O and C—O species are indicative of the presence of O dopant atoms in the materials that possibly come from the silica framework (Jang et al. (2004) Appl. Phys. Lett., 84:2877-2879; Silva et al. (2013) J. Am. Chem. Soc., 135:7823-7826). As can be seen in FIG. 15D, the content of C=O PPY-NMPCs is somewhat similar in all the PPY-NMPC samples. However, the content of C=C moieties is noticeably low in the PPY-NMPC sample obtained at 900° C. Additionally, the ratio of graphitic to pyridinic N in PPY-NCB-900 is also lower than that in PPY-NMPC-900. In the high resolution C is spectra, there is only a peak at 284.4 eV, that corresponds to C=C bond, with minor lower band shift at 282 eV (Silva et al. (2012) Angew. Chem. Int. Ed., 51:7171-7175).

Elemental analysis revealed that PPY-NCB-900 has much lower N (1.63 at. %) than PPY-NMPC-900 (3.29 at %). Besides being consistent with the result obtained from Raman spectroscopy analysis (FIG. 14D), this result indicates that the SBA-15 framework protects loss of N from the materials during pyrolysis of PPY.

Figure 16:
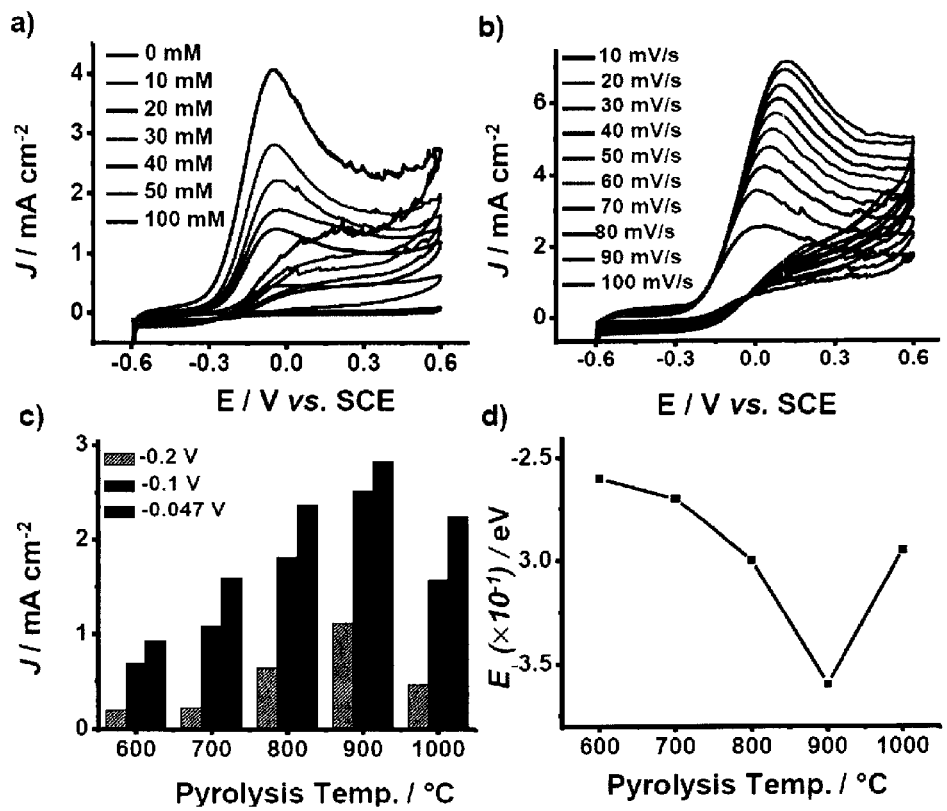

The electrocatalytic activities of all the PPY-derived metal-free nitrogen-doped mesoporous carbons prepared at different pyrolysis temperatures were investigated with cyclic voltammetry. This is carried out using a typical three electrode system consisting of a glassy carbon electrode (GCE) modified with PPY-NMPCs as the working electrode. The results are presented in FIG. 16. As mentioned above, carrying out catalytic electrooxidation of hydrazine is appealing because it offers high density of hydrogen and can serve as fuel in fuel cells with high theoretical cell voltage but no $CO_2$ emission. FIG. 16A shows the cyclic voltammograms at a scan rate of 10 mV/s at pH 7.4 in 0.1M phosphate buffer saline (PBS) containing different concentrations of hydrazine (ranging from 10 mM to 100 mM) in presence of on PPY-NMPC-900. PPY-NMPC-900 displays remarkable electrocatalytic activity toward hydrazine oxidation, with an overpotential of −0.36 V (vs. saturated calomel electrode, SCE), which is much lower than that of commercial Pt/C (1 wt. % Pt). When the concentration of hydrazine is increased, a linear relationship is observed between peak current and hydrazine concentration in the range of 10 mM to 100 mM hydrazine. On the other hand, the kinetic results reveal that increase in potential scan rate induces an increase in the electrocatalytic peak current and a shift to a more positive overpotential for the catalytic oxidation of hydrazine (FIG. 16B). The oxidation current varies linearly with the square root of scan rate, which in turn suggests that the HOR is a diffusion-controlled reaction. In addition, there is no corresponding cathodic peak during the reverse scan, indicating a totally irreversible oxidation of hydrazine in PBS solutions in the presence of the PPY-NMPC-900. This is further verified by polarization curve on experiments performed with rotating disc electrode (RDE). Other samples synthesized under different pyrolysis temperatures also show good electrocatalytic activity toward hydrazine oxidation and their activity is directly dependent on their pyrolysis temperature. FIG. 16C displays the current density obtained for all the PPY-NMPCs in 0.1M PBS solution with 50 mM hydrazine at different potentials. Among all the PPY-derived mesoporous carbon samples, the one obtained at 900° C. gives the best electrocatalytic activity, showing higher current density at different potentials and lower overpotential than any other samples. This is also why this particular sample was discussed in rather more detail in this report.

As the pyrolysis temperature is raised from 600° C. to 900° C., the catalytic activity of the material increases, as seen from the gradual shift of the onset potential to a higher negative value (FIG. 16D). The increase in the electrocatalytic activity of the materials appears to correlate well with the increase of the proportion of graphitic structure in the materials, which is evident from the decrease of $I_D/I_G$ ratio as discussed before. However, the overpotential becomes more positive when the pyrolysis temperature is increased to 1000° C., which may be ascribed to the low content of N in the material at higher pyrolysis temperatures. Interestingly, the lowest onset potential is consistent with the highest content of C=N(C—O) for sample PPY-NMPC-900.

For comparison, the cyclic voltammogram for PPY-NCB-900 in 0.1M PBS solution at pH=7.4 containing 50 mM hydrazine at the scan rate of 10 mV/s was also obtained. The sample gives a more positive overpotential (E=−0.1 V) and much lower peak current density (1.84 mA/cm$^2$) than PPY-NMPC-900. This difference could partly be due to the small specific surface area of the former and low content of N dopant compared with that of the latter (Table 5). It is intriguing that the PPY-derived mesoporous carbon (PPY-NMPC-900) showed higher electrocatalytic activity than other polymer-derived mesoporous carbons synthesized under identical synthetic conditions, e.g., polyaniline-derived N-doped mesoporous carbons.

TABLE 5

The comparison between PPY- NMPC-900 and PPY- NCB-900.

| Sample | Overpotential [a] (V vs. SCE) | BET surface area (m$^2$/g) [b] | BJH pore size (nm) [b] | At. % of N[c] |
|---|---|---|---|---|
| PPY-NMPC-900 | −0.36 | 398 | 3.7 | 3.29 |
| PPY-NCB-900 | −0.1 | 39 | — | 1.63 |

[a] Obtained from cyclic voltammetry at pH 7.4 in 0.1M PBS with 50 mM hydrazine on different carbons.
[b] Obtained from N$_2$ adsorption/desorption isotherm and using the BJH pore size analysis.
[c]Obtained from XPS data.

The above electrochemical results clearly demonstrate that PPY-NMPCs are efficient metal-free electrocatalyst for hydrazine oxidation; they can thus be used as electrocatalyst in the anode side of direct hydrazine fuel cell. This can be supported further by comparing their electrocatalytic activities with those of similar candidate materials recently documented in hydrazine oxidation (Table 6). Despite the fact that direct comparison is not possible in all cases because of the difference in reaction conditions, based on onset potential values for hydrazine electrooxidation, PPYNMPC-900 clearly exhibits better electrocatalytic activity than many other nanomaterials. The origin of the PPY-NMPC-900's high electrocatalytic activity is most likely to involve the high density of nitrogen dopant and nitrogen-related structural defect sites, and also the large surface area of the materials rendering it larger contact areas to interact with solution/reactant(s) during the electrocatalytic reactions.

TABLE 6

Selected recent literature results of catalytic activities of different nanomaterials for hydrazine electrooxidation compared with the instant invention.

| Electrode | Medium | Sweep Rate | Conc. [N$_2$H$_4$] | Onset Potential (vs. SCE) |
|---|---|---|---|---|
| Au/TiO$_2$ nanotubes | 0.1M PBS pH = 7 | 100 mV/s | 0.85 mM | −0.1 V |
| Carbon nanoneedles | 0.1M PBS pH = 7.4 | 20 mV/s | 10 mM | 0.15 V |
| Au NPs/single wall carbon nanotubes | 0.1M PBS pH = 7.4 | 10 mV/s | 2 mM | 0.15 V |
| TiO$_2$—Pt nanofilms | 0.1M PBS pH = 7 | 100 mV/s | 4 mM | 0.0 V |
| Pd/WO$_3$ | 0.1M K$_2$SO$_4$ | 100 mV/s | 5 mM | 0.1 V |
| Mesoporous Mn$_2$O$_3$ | 0.1M PBS pH = 7 | 100 mV/s | 8 mM | 0.3 V |
| Fe$_2$O$_3$/CP-epoxy | 0.1M PBS pH = 7.4 | 100 mV/s | 1 mM | 0.35 V |
| Ni$_{60}$Co$_{40}$ | 1.0M KOH | 100 mV/s | 100 mM | −0.1 V [a] |
| Pd/C | 0.05M H$_2$SO$_4$ | 100 mV/s | 10 mM | 0.0 V |
| Pd—Ni/CNT | 1.0M NaOH | 10 mV/s | 20 mM | −0.25 V |

TABLE 6-continued

Selected recent literature results of catalytic activities of different nanomaterials for hydrazine electrooxidation compared with the instant invention.

| Electrode | Medium | Sweep Rate | Conc. [$N_2H_4$] | Onset Potential (vs. SCE) |
|---|---|---|---|---|
| Heteropolypalladate $Pd_{13}$ | 0.4M ($NaH_2PO_4$ + NaOH), pH = 7 | 100 mV/s | 0.201 mM | −0.1 V [b] |
| PPY-NMPC-900 | 0.1M PBS pH = 7.4 | 10 mV/s | 50 mM | −0.36 V |

[a] Measured as vs. RHE.
[b] Measured as vs. NHE.
Results obtained from Hosseini et al. (2011) J. Mol. Catal. A: Chem., 335: 199-204; Silva et al. (2012) Angew. Chem. Int. Ed., 51: 7171-7175; Fukuhara et al. (2011) ChemSusChem, 4: 778-784; Ding et al. (2011) Nanoscale 3: 1149-1157; Ye et al. (2008) Thin Solid Films 516: 2957-2961; Ding et al. (2011) Electroanalysis 5: 1245-1251; Ljukic et al. (2006) Electroanalysis 18: 1757-1762; Chinchilla et al. (2011) J. Am. Chem. Soc., 133: 5425-5431; Liang et al. (2011) Appl. Catal. B: Environ., 103: 388-396; Ye et al. (2011) J. Power Sources 196: 956-961; Chubarova et al. (2008) Angew. Chem. Int. Ed., 47: 9542-954.

Thus, it has been shown that polypyrrole-derived N-doped mesoporous carbons can serve as efficient metal-free electrocatalyst for hydrazine oxidation reaction, with low overpotential. The material was prepared by pyrolyzing the PPY/SBA-15 composite material, which was obtained via in-situ polymerization of pyrrole within the pores of SBA-15 mesoporous silica. The nitrogen doping in PPY-NMPCs (in the forms of pyridine-like and graphite-like nitrogens) are dependent on the pyrolysis temperatures. The materials can also act as an alternative for noble metal-based materials such as Pt/C catalysts that are commonly used for electroxidation in fuel cells. The synthetic method can be further extended to other polymers to produce other heteroatom-doped mesoporous carbons, e.g., B and S doped mesoporous carbons with electrocatalytic activities towards various reactions employed in fuel cells.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

What is claimed is:

1. A method of synthesizing polyaniline-derived mesoporous carbon comprising:
  a) synthesizing polyaniline within the pores of a mesoporous silica template, said synthesis method comprising:
    i) coating the interior of the pores of the mesoporous template with cationic groups;
    ii) contacting the cationic groups with persulfate, thereby electrostatically immobilizing the persulfate; and
    iii) contacting the electrostatically immobilized persulfate with a polyaniline precursor under acidic conditions, thereby synthesizing said polyaniline;
  b) heating said polyaniline contained within said mesoporous silica template to a temperature greater than about 600° C. until carbonization; and
  c) isolating the polyaniline-derived mesoporous carbon from the template, wherein said polyaniline-derived mesoporous carbon comprises less than about 1.0% metal by weight.

2. The method of claim 1, wherein step b) comprises heating polyaniline contained within a mesoporous silica template to a temperature greater than about 700° C. until carbonization.

3. The method of claim 1, wherein step b) comprises heating polyaniline contained within a mesoporous silica template to a temperature between about 750° C. and about 850° C. until carbonization.

4. The method of claim 1, wherein step b) comprises heating polyaniline contained within a mesoporous silica template to a temperature of about 800° C. until carbonization.

5. The method of claim 1, wherein said mesoporous silica is selected from the group consisting of MCM-41, MCM-48, SBA-15, SBA-1, SBA-16, MSU-X, MSU-F, KSW-2, FSM-16, MM-33, and TUD-1.

6. The method of claim 1, wherein said mesoporous silica is SBA-15.

7. The method of claim 1, wherein step c) comprises etching the mesoporous silica.

8. The method of claim 1, wherein said mesoporous silica template is periodic mesoporous organosilica (PMO).

9. The method of claim 1, wherein said polyaniline-derived mesoporous carbon contains no metal.

10. The method of claim 1, wherein said cationic groups are with diamine groups.

11. The polyaniline-derived mesoporous carbon synthesized by the method of claim 1.

12. A method of catalyzing a chemical reaction, said method comprising adding at least one polyaniline-derived mesoporous carbon of claim 11 to said chemical reaction.

13. The method of claim 12, wherein said chemical reaction is the oxygen-reduction reaction.

14. A membrane electrode assembly comprising at least one polyaniline-derived mesoporous carbon of claim 11.

15. A fuel cell comprising the membrane electrode assembly of claim 14.

* * * * *